US009219812B2

(12) United States Patent
Kim et al.

(10) Patent No.: US 9,219,812 B2
(45) Date of Patent: Dec. 22, 2015

(54) MOBILE TERMINAL

(75) Inventors: Seho Kim, Seoul (KR); Yeonhwa Lee, Seoul (KR); Byeonghak Jung, Seoul (KR); Youngsun Park, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 303 days.

(21) Appl. No.: 13/553,674

(22) Filed: Jul. 19, 2012

(65) Prior Publication Data

US 2013/0024814 A1    Jan. 24, 2013

(30) Foreign Application Priority Data

Jul. 22, 2011 (KR) ................ 10-2011-0072895

(51) Int. Cl.
*H04M 1/725* (2006.01)
(52) U.S. Cl.
CPC ...... *H04M 1/72583* (2013.01); *H04M 1/72544* (2013.01)
(58) Field of Classification Search
CPC .................. H04M 1/72583; H04M 1/72544
USPC .......................... 715/708, 810, 847
See application file for complete search history.

(56) References Cited

U.S. PATENT DOCUMENTS

| 7,730,425 | B2* | 6/2010 | de los Reyes et al. | 715/835 |
| 2007/0273663 | A1* | 11/2007 | Park et al. | 345/173 |
| 2009/0213086 | A1* | 8/2009 | Chae et al. | 345/173 |
| 2009/0227296 | A1* | 9/2009 | Kim | 455/566 |
| 2010/0083150 | A1* | 4/2010 | Nurmi et al. | 715/764 |
| 2010/0262928 | A1* | 10/2010 | Abbott | 715/769 |
| 2010/0269040 | A1* | 10/2010 | Lee | 715/702 |
| 2011/0105193 | A1* | 5/2011 | Lee et al. | 455/566 |
| 2013/0053105 | A1* | 2/2013 | Lee et al. | 455/565 |
| 2013/0198156 | A1* | 8/2013 | Penikis | 707/705 |

* cited by examiner

*Primary Examiner* — Andrea Long
(74) *Attorney, Agent, or Firm* — Lee, Hong, Degerman, Kang & Waimey

(57) ABSTRACT

A mobile terminal is disclosed. The mobile terminal may include a display module and a controller. The display module displays a plurality of icons on a background thereof. The controller changes the background to a specific background predetermined for a specific icon upon selection of the specific icon from the plurality of icons, and executes a specific application corresponding to the specific icon using information corresponding to a specific region of the changed background when the selected specific icon is moved to the specific region.

10 Claims, 68 Drawing Sheets

Weather

MOBILE TERMINAL

CROSS-REFERENCE TO RELATED APPLICATIONS

Pursuant to 35 U.S.C. 119 (a), this application claims the benefit of earlier filing date and right of priority to Korean Patent Application No. 10-2011-0072895 filed on Jul. 22, 2011, the contents of which are hereby incorporated by reference herein in their entirety.

BACKGROUND

1. Field

The present invention relates to a mobile terminal, and more particularly, to a mobile terminal capable of executing an application corresponding to an icon which is selected and moved to a specific region of a background using information corresponding to the specific region.

2. Related Art

As functions of terminals such as personal computers, laptop computers, cellular phone diversify, the terminals become multimedia players having multiple functions for capturing pictures or moving images, playing music, moving image files and games and receiving broadcasting programs.

To support and enhance the increasing number of functions in a terminal, improving a structural part and/or a software part of the terminal would be considered. As recent various terminals including a mobile terminal provide complex and diverse functions, menu structures of the terminals become complicated.

SUMMARY

An object of the present invention is to provide a mobile terminal capable of changing a background when a specific icon displayed on the background is selected and executing an application corresponding to the specific icon using information corresponding to the changed background on the basis of movement of the specific icon on the changed background.

An object of the present invention is to provide a mobile terminal capable of dividing a background into a plurality of regions when a specific icon displayed on the background is selected and executing an application relating to the specific icon on the basis of movement of the specific icon to the plurality of regions.

According an aspect of the present invention, there is provided a mobile terminal including a display module is configured to display a plurality of icons on a background, and a controller is configured to change the background to a specific background predetermined for a specific icon upon selection of the specific icon from the plurality of icons, and execute a specific application corresponding to the specific icon using information corresponding to a specific region of the changed background when the selected specific icon is moved to the specific region.

According another aspect of the present invention, there is a mobile terminal including a display module is configured to display a specific icon on a background, and a controller is configured to divide the background into a plurality of regions while maintaining display state of the background when the specific icon is selected and is configured to execute a function of a specific application predetermined for the specific icon when the specific icon is moved to a specific region from among the plurality of regions.

According another aspect of the present invention, there is provided a mobile terminal including a display module is configured to display a specific icon on a background, and a controller is configured to display a layer on which a predetermined menu of a specific application corresponding to the specific icon is displayed when the specific icon is selected by a first touch, and is configured to execute the predetermined menu using information corresponding to a region selected by a second touch applied to the layer while the first touch is maintained.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
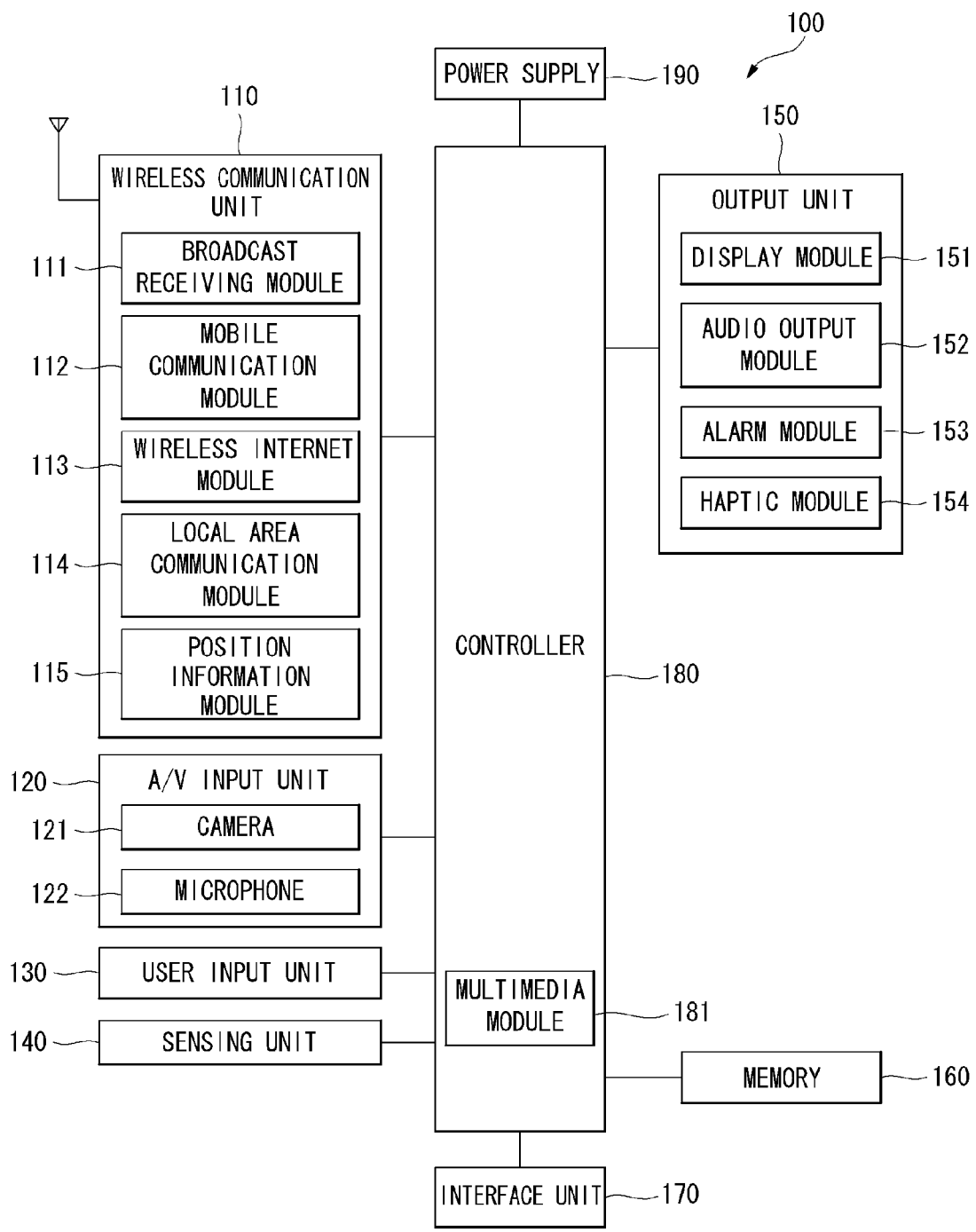
FIG. 1 is a block diagram of a mobile terminal according to an embodiment of the present invention.

FIG. 1 is a block diagram of an implementation of a mobile terminal 100. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time.

Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display module 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display module 151, an audio output module 152, an alarm module 153 and a haptic module 154.

The display module 151 displays information processed by the mobile terminal 100. For example, the display module 151 displays UI or graphic user interface (GUI) related to a telephone call when the mobile terminal is in the call mode. The display module 151 displays a captured or/and received image, UI or GUI when the mobile terminal 100 is in the video telephony mode or the photographing mode.

The display module 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display module 151 can also be of the light transmission type. According to this structure, a user can see an object located behind the body of the mobile terminal 100 through an area of the body of the mobile terminal 100, which is occupied by the display module 151.

The mobile terminal 100 can include at least two display modules 151 according to constitution of the terminal. For example, the mobile terminal 100 can include a plurality of displays that are arranged on a single face at a predetermined distance or integrated. Otherwise, the plurality of displays can be arranged on different sides.

In the case where the display module 151 and a sensor sensing touch (referred to as a touch sensor hereinafter) form a layered structure, which is referred to as a touch screen hereinafter, the display module 151 can be used as an input device in addition to an output device. The touch sensor can be in the form of a touch film, a touch sheet and a touch pad, for example.

The touch sensor can be constructed such that it converts a variation in pressure applied to a specific portion of the display module 151 or a variation in capacitance generated at a specific portion of the display module 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm module 153 outputs a signal for indicating generation of an event of the mobile terminal 100. Examples of events generated in the mobile terminal include receiving of a call signal, receiving of a message, input of a key signal, input of touch, etc. The alarm module 153 can output signals in forms different from video signals or audio signals, for example, a signal for indicating generation of an event through vibration. The video signals or the audio signals can be also output through the display module 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices.

The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a card slot included in the interface 170.

The configuration of the mobile terminal 100 according to an embodiment of the present invention has been described with reference to FIG. 1. A description will be made of a method of executing an application in the mobile terminal 100 according to the present invention.

Figure 2:
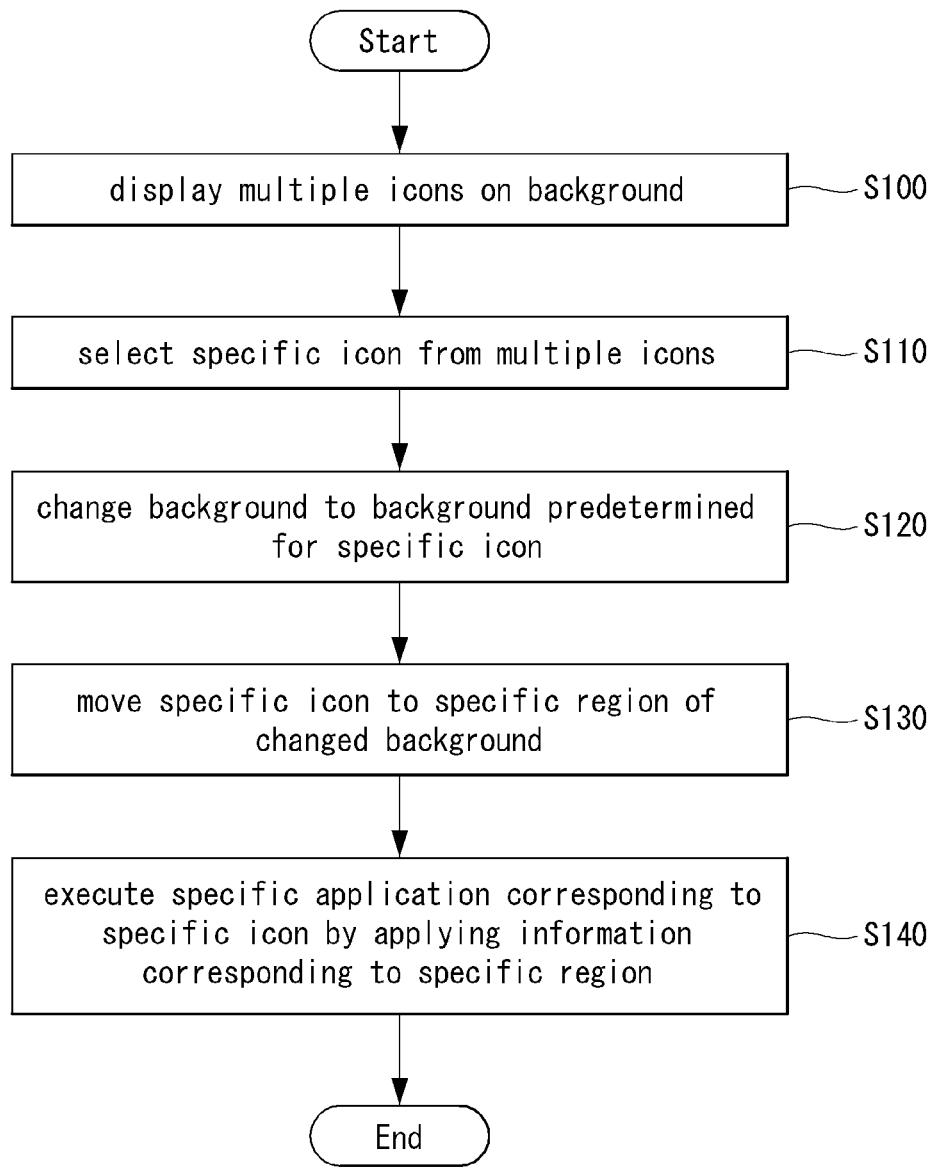
FIG. 2 is a flowchart illustrating a method of executing an application in the mobile terminal according to an embodiment of the present invention.

FIG. 2 is a flowchart illustrating a method of executing an application in the mobile terminal 100 according to an embodiment of the present invention.

The controller 180 of the mobile terminal 100 displays a background on the display module 151 and displays a plurality of icons on the background (S100). Then, the controller 180 select a specific icon from the plurality of icons on the basis of an input signal received through the user input unit 130 (S110). The input signal can be generated by operating an input button included in the user input unit 130 or by touching a touch screen implemented as the user input unit 130. However, the scope of the present invention is not limited thereto.

Here, selection of the specific icon means selection for executing a specific application relating to the specific icon by interworking with the background rather than selection for simply executing the specific application. For example, if selection for simply executing the specific application is made by double click, selection of the specific application in step S110 can be performed by long click.

When the display module 151 is implemented as a touch screen, if selection for simply executing the specific application is made by one touch, selection of the specific application in step S110 can be performed by long touch or double touch. However, the scope of the present invention is not limited thereto.

Upon selection of the specific icon, the controller 180 changes the background from a default background to a predetermined background (S120). The predetermined background may be an execution screen of an application that is predetermined for the specific icon. For example, the predetermined background may be a execution screen of another application relating to a function of the specific application corresponding to the specific icon.

The other application may be previously determined when the mobile terminal 100 is manufactured or may be selected by the user. Information about the other application for implementation of the application execution method of the mobile terminal 100, shown in FIG. 2, may be previously stored in the memory 160.

Otherwise, the predetermined background may be a predetermined screen for providing information relating to the specific application. For example, if the specific application is an application using location information, the predetermined background can be a map image for providing predetermined location information interworking with the specific application. Here, the application using location information can include a navigation application, a weather application, etc.

If the specific application is an application using weather information, the predetermined background may be a calendar image for providing weather information that is predetermined to interwork with the specific application. Here, the application using weather information can include a scheduling application, a memo application, etc.

After the background is changed to the predetermined background, the specific icon is moved to a specific region of the changed background (S130). Upon movement of the specific icon to the specific region, the controller 180 executes the specific application using information corresponding to the specific region (S140). Here, the information corresponding to the specific region may be matched to the specific region and stored in the memory 160. The information corresponding to the specific region may be determined when the mobile terminal 100 is manufactured or may be selected by the user.

If the specific icon is not moved to the specific region and selection of the specific icon is cancelled in the state that the specific icon has been selected and the background has been changed, the controller 180 can restore the changed background to the default background. That is, the controller 180 can maintain the changed background when the specific icon is selected and restore the changed background to the default background when selection of the specific icon is cancelled.

Upon completion of execution of the specific application using the information corresponding to the specific region, the controller 180 may restore the changed background to the default background, which is not shown in FIG. 2. Otherwise, the controller 180 may maintain the changed background even after execution of the specific application is completed.

Figure 3:
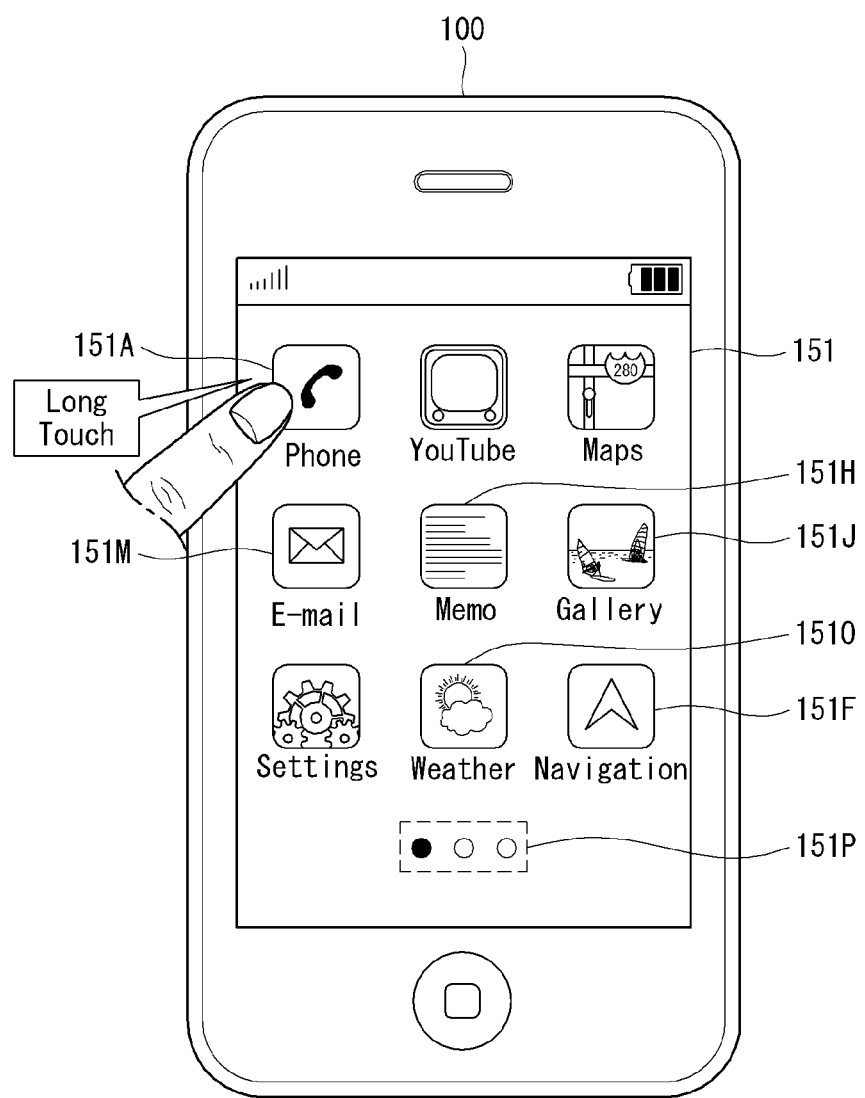
FIGS. 3, 4 and 5 illustrate a procedure of executing a call send application according to the application execution method of the mobile terminal shown in FIG. 2.
Figure 4:
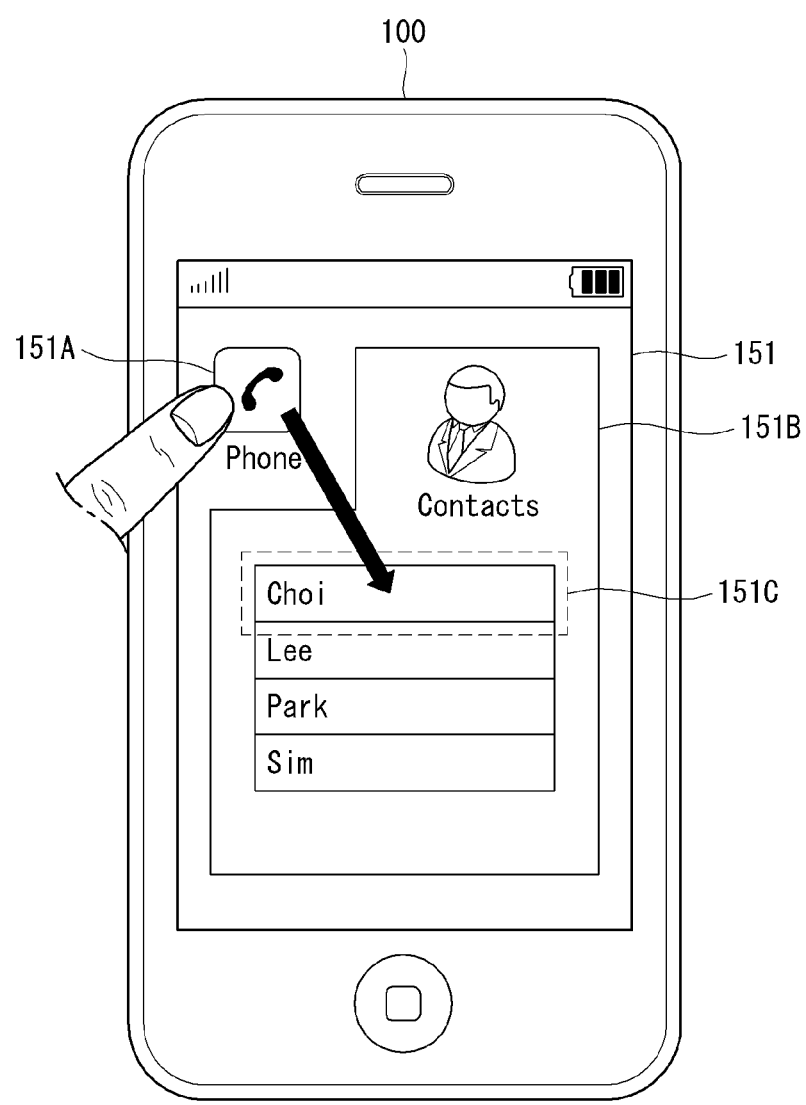
Figure 5:
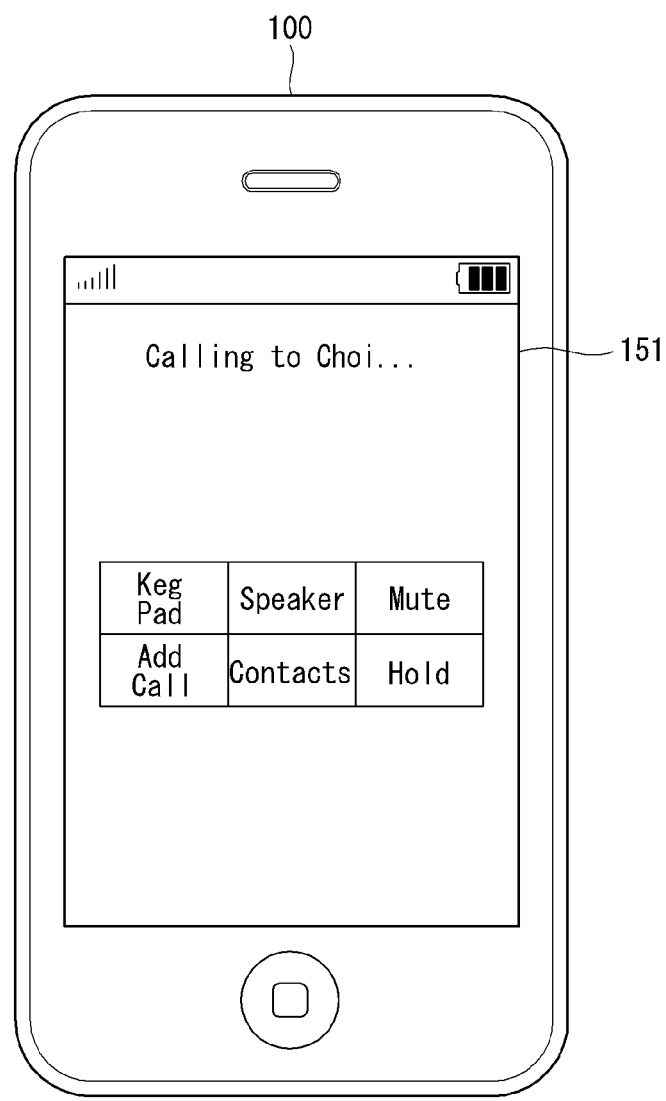

FIGS. 3, 4 and 5 illustrate a procedure of executing a call send application according to the application execution method of the mobile terminal 200, shown in FIG. 2. The procedure of executing the call send application is described on the assumption that the display module 151 of the mobile terminal 100 is implemented as a touch screen. Implementation of the display module 151 as a touch screen will be applied to embodiments which will be described later.

Referring to FIG. 3, the user selects a call send application icon 151A from a plurality of icons displayed on the background by long-touching the icon 151A. Then, the controller 180 of the mobile terminal 100 changes the background to a contact application execution screen 151B that is predetermined for the call send application, as shown in FIG. 4.

In the state that the contact application execution screen 151B is displayed as a background, the user moves the call send application icon 151A to a specific region 151C of the contact application execution screen 151B, as shown in FIG. 4. Then, the controller 180 sends a call to a contact corresponding to the specific region 151C, as shown in FIG. 5. Upon completion of the call send application, the controller 180 can restore the contact application execution screen 151B to the default background of the display module 151 as shown in FIG. 3.

Figure 6:
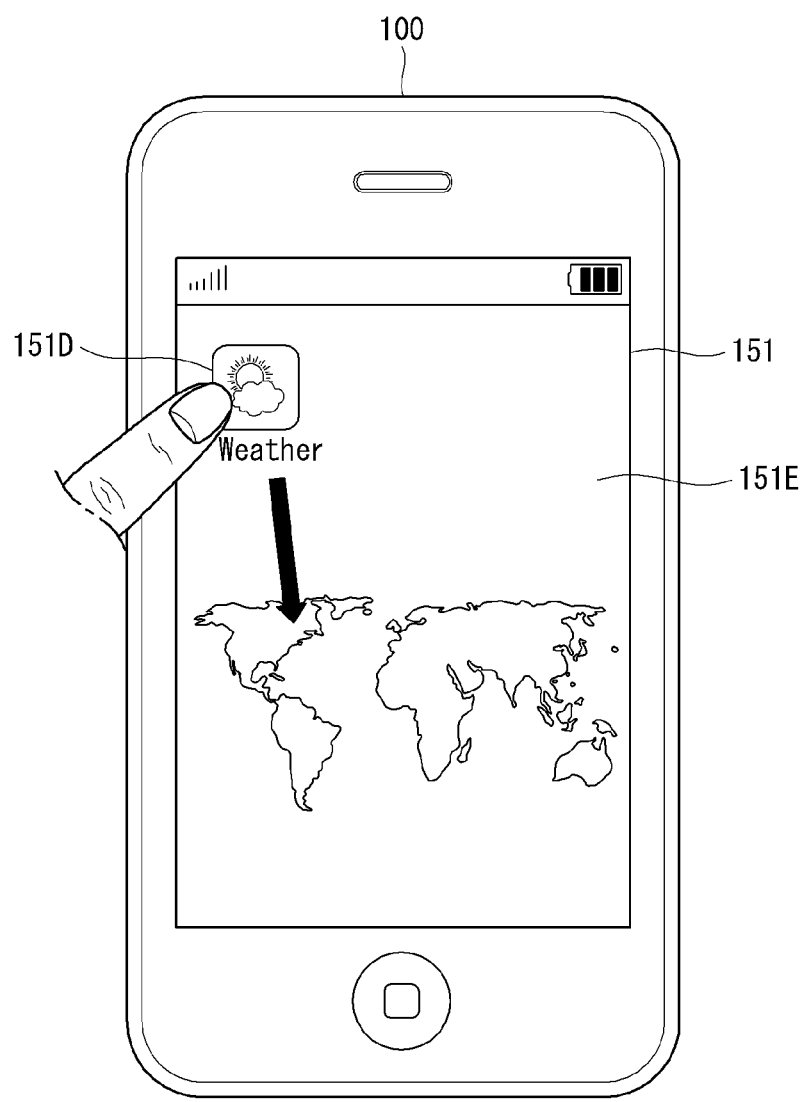
FIGS. 6 and 7 illustrate a procedure of executing a weather application according to the application execution method of the mobile terminal shown in FIG. 2.
Figure 7:
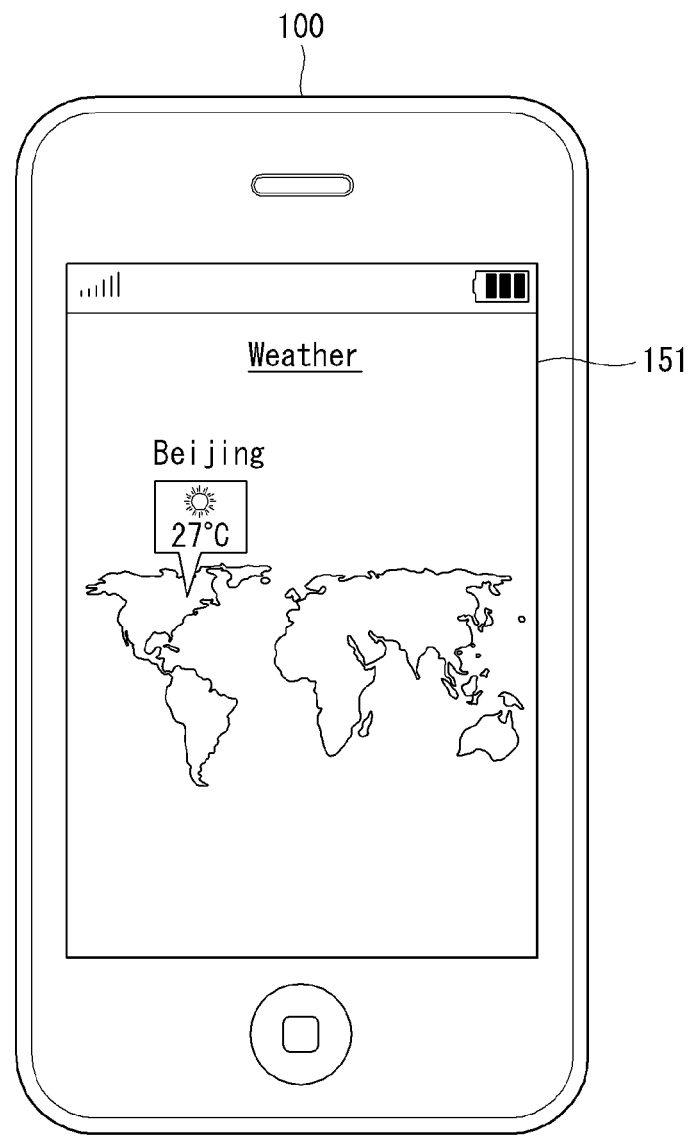

FIGS. 6 and 7 illustrate a procedure of executing a weather application according to the application execution method of the mobile terminal 100, shown in FIG. 2. FIG. 6 shows a predetermined map image 151E for providing information about the weather application, which is changed from the background shown in FIG. 3 according to selection of a weather application icon 151D by the user.

In the state that the map image 151E is displayed as a background, the user moves the weather application icon 151D to a specific region of the map image 151E, as shown in FIG. 6. Then, the controller 180 executes the weather application and displays weather information of an area corresponding to the specific region on the display module 151, as shown in FIG. 7.

Figure 8:
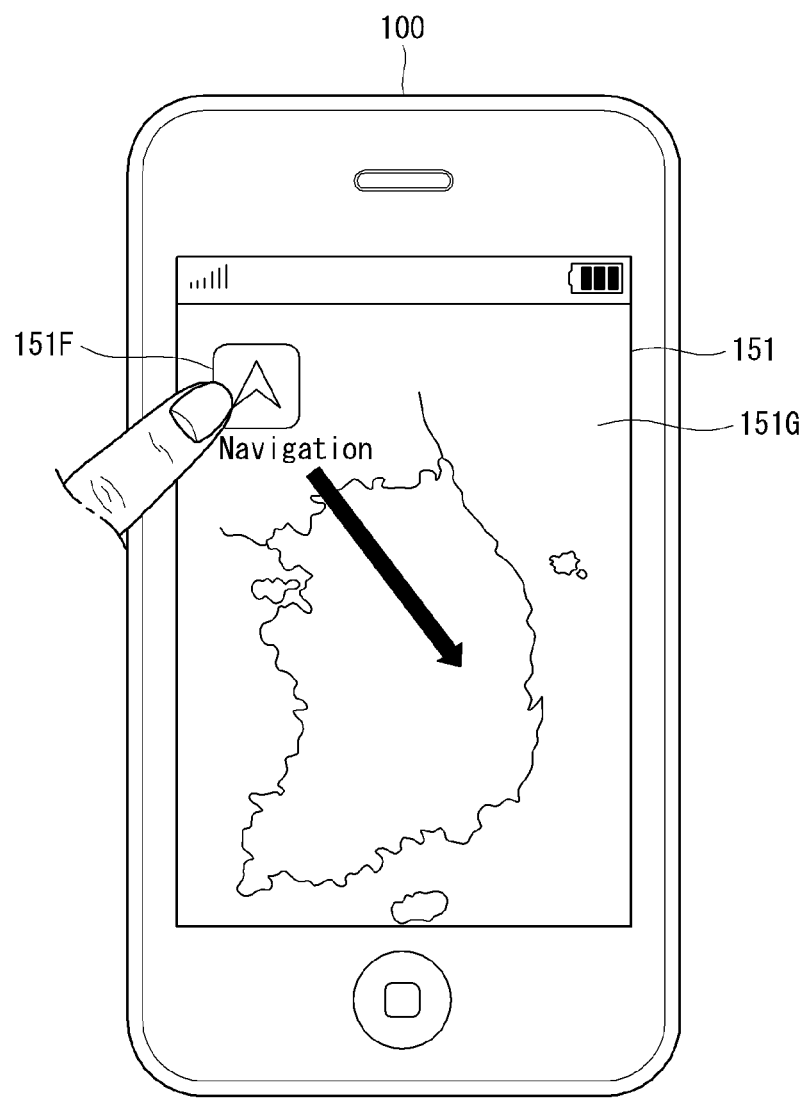
FIGS. 8 and 9 illustrate a procedure of executing a navigation application according to the application execution method of the mobile terminal shown in FIG. 2.
Figure 9:
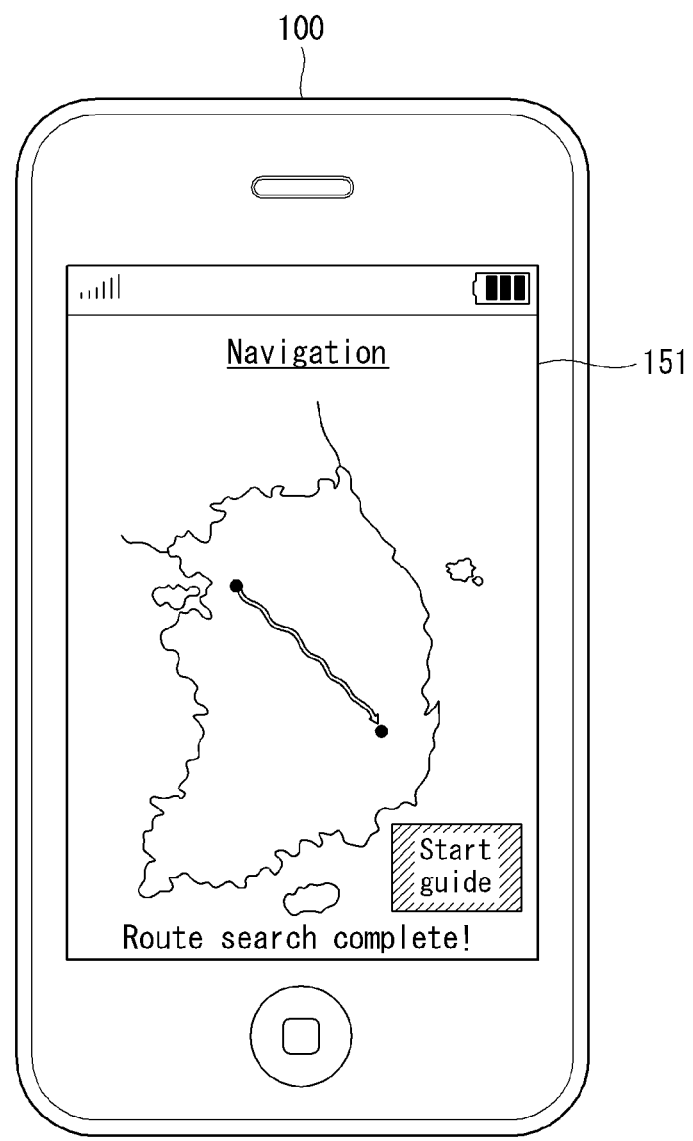

FIGS. 8 and 9 illustrate a procedure of executing a navigation application according to the application execution method of the mobile terminal 100, shown in FIG. 2. FIG. 8 shows a predetermined map image 151G for providing information about the navigation application, which is changed from the background shown in FIG. 3 according to selection of a navigation application icon 151F by the user.

In the state that the map image 151G is displayed as a background, the user moves the navigation application icon 151F to a specific region of the map image 151G, as shown in FIG. 8. Then, the controller 180 executes the navigation application to search a route to the specific region and displays the route on the display module 151, as shown in FIG. 9.

Figure 10:
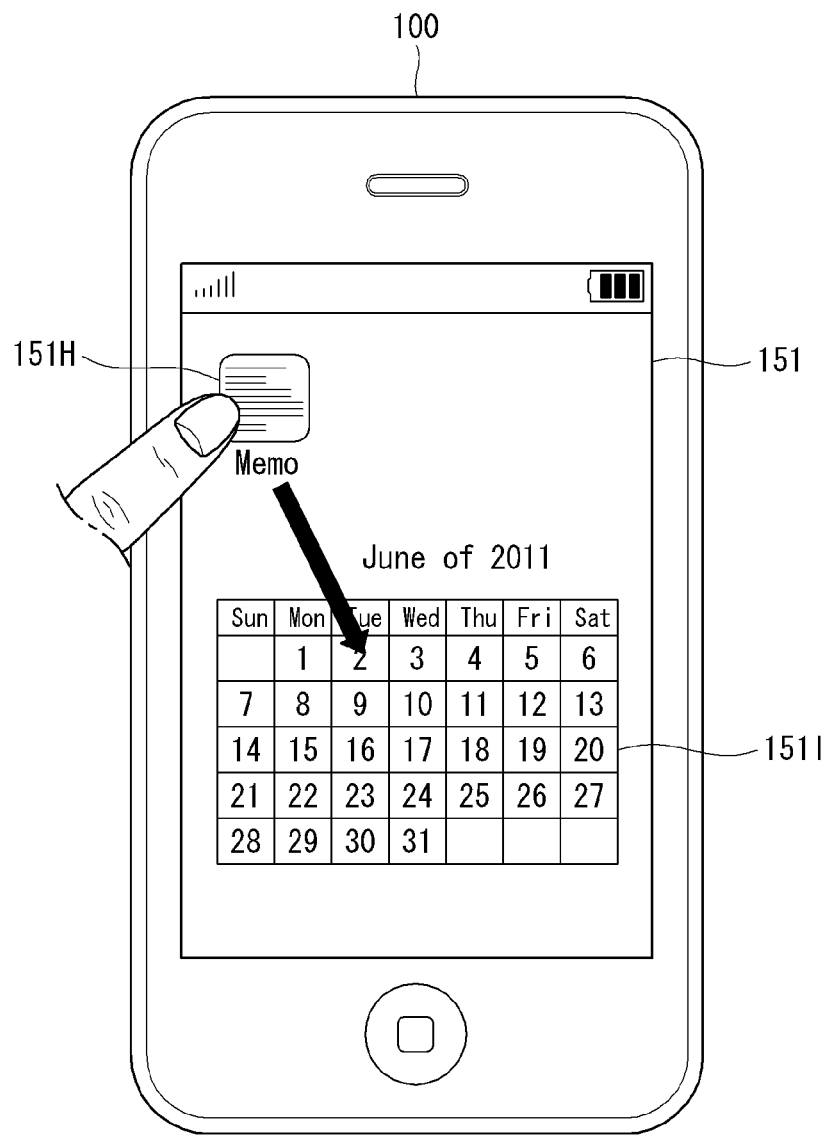
FIGS. 10 and 11 illustrate a procedure of executing a memo application according to the application execution method of the mobile terminal shown in FIG. 2.
Figure 11:
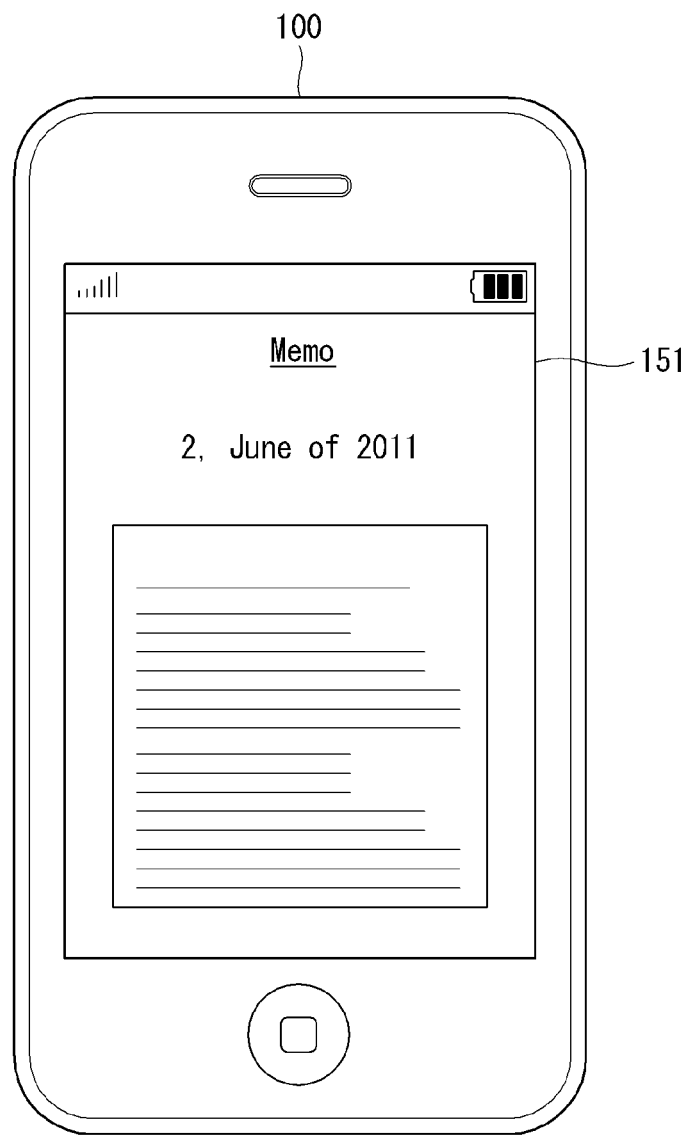

FIGS. 10 and 11 illustrate a procedure of executing a memo application according to the application execution method of the mobile terminal 100, shown in FIG. 2. FIG. 10 shows a predetermined calendar image 151I for providing date information about the memo application, which is changed from the background shown in FIG. 3 according to selection of a memo application icon 151H by the user.

In the state that the calendar image 151I is displayed as a background, the user moves the memo application icon 151H to a specific region of the calendar image 151I, as shown in FIG. 10. Then, the controller 180 executes the memo application and displays a memo input screen for a date corresponding to the specific region on the display module 151, as shown in FIG. 11.

Figure 12:
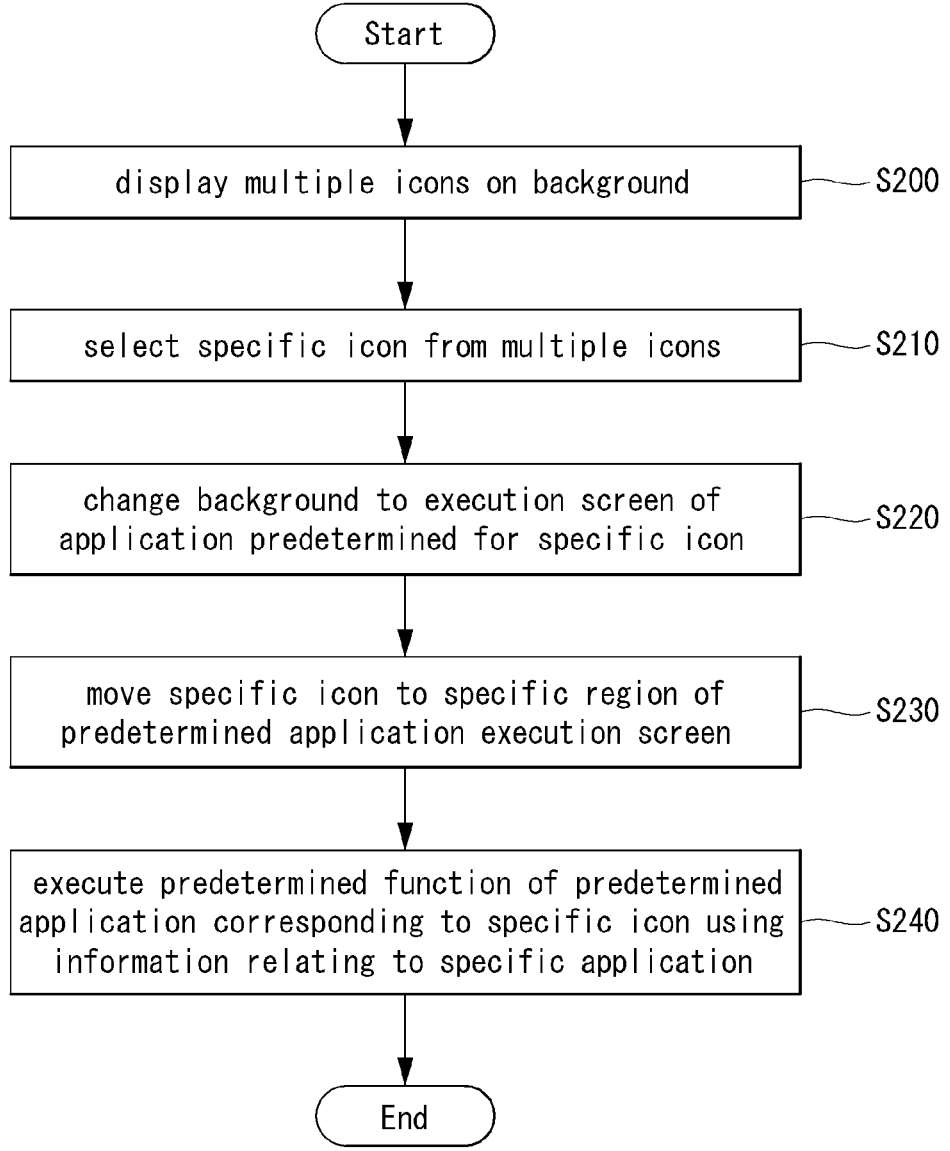
FIG. 12 is a flowchart illustrating a method of executing an application in the mobile terminal according to another embodiment of the present invention.

FIG. 12 is a flowchart illustrating a method of executing an application in the mobile terminal 100 according to another embodiment of the present invention.

Referring to FIG. 12, a plurality of icons is displayed on the background (S200). A specific icon is selected from the plurality of icons displayed on the background (S210). Then, the controller 180 of the mobile terminal 100 changes the background to a execution screen of an application predetermined for the specific icon (S220).

In the state that the background is changed to the predetermined application execution screen, the specific icon is moved to a specific region of the predetermined application execution screen (S230). Then, the controller 180 executes a predetermined function from among functions of the predetermined application, which corresponds to the specific region using information relating to the specific application (S240).

The application execution method shown in FIG. 12 executes an application whose execution screen is displayed on the background while the application execution method shown in FIG. 2 executes an application corresponding to a specific icon that is moved to a specific region of the background. The application execution method shown in FIG. 12 can restore the changed background to the default background or maintain the changed background until a predetermined condition is satisfied after the predetermined function of the predetermined application is executed, which is similar to the application execution method shown in FIG. 2.

Figure 13:
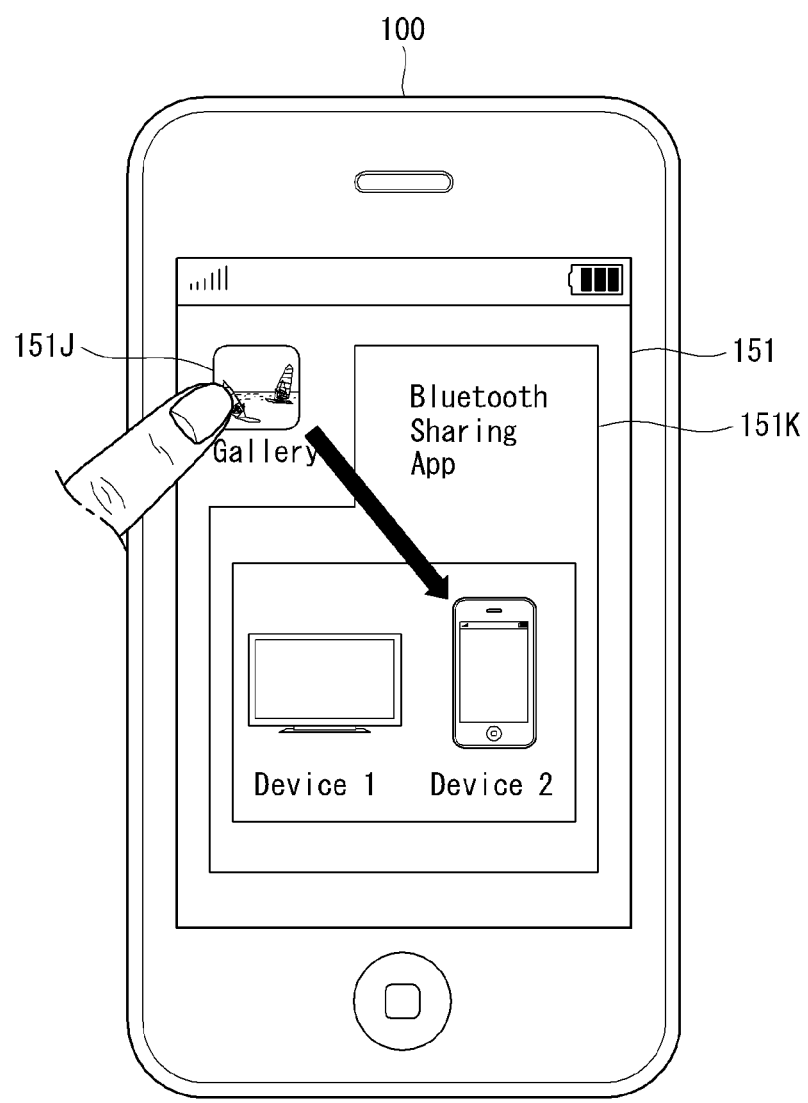
FIGS. 13 and 14 illustrate a procedure of executing a sharing application according to the application execution method of the mobile terminal shown in FIG. 12.
Figure 14:
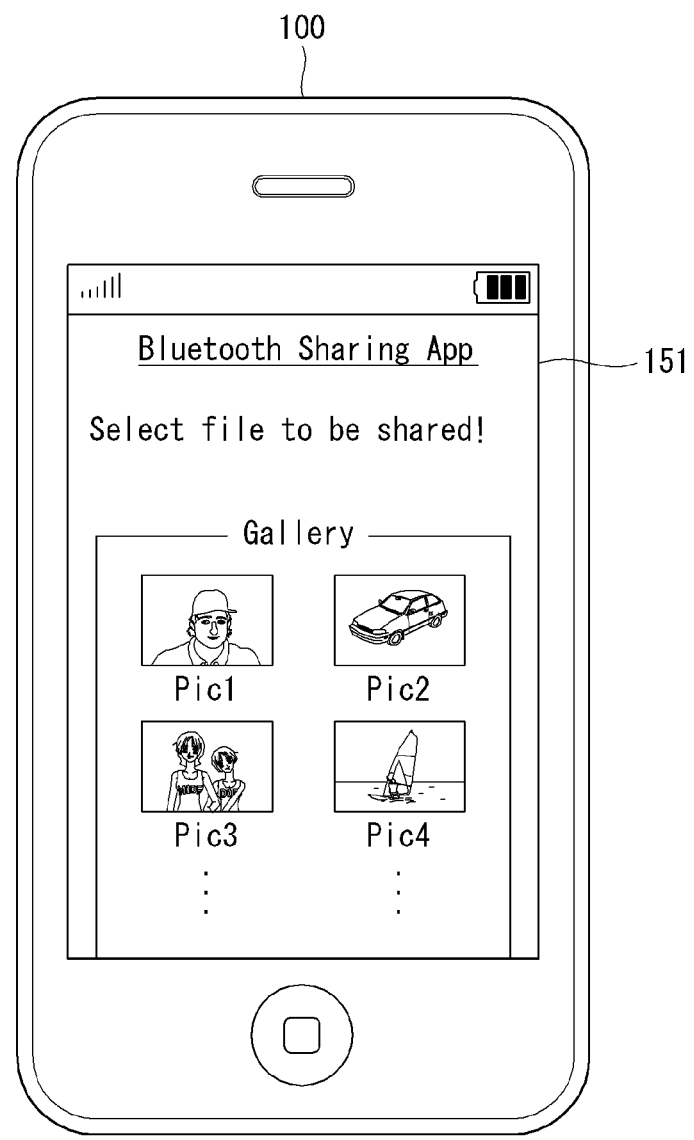

FIGS. 13 and 14 illustrate a procedure of executing a sharing application according to the application execution method of the mobile terminal 100, shown in FIG. 12. FIG. 13 shows a Bluetooth sharing application execution screen 151K predetermined in a gallery application, which is changed from the background shown in FIG. 3 according to selection of a gallery application icon 151J of FIG. 3 by the user.

In the state that the Bluetooth sharing application execution screen 151K is displayed as a background, the user moves the Bluetooth sharing application icon 151J to a specific region of the Bluetooth sharing application execution screen 151K, as shown in FIG. 13. Then, the controller 180 executes a Bluetooth sharing application to perform a sharing function with a specific device corresponding to the specific region using an image relating to the gallery application, as shown in FIG. 14.

Figure 15:
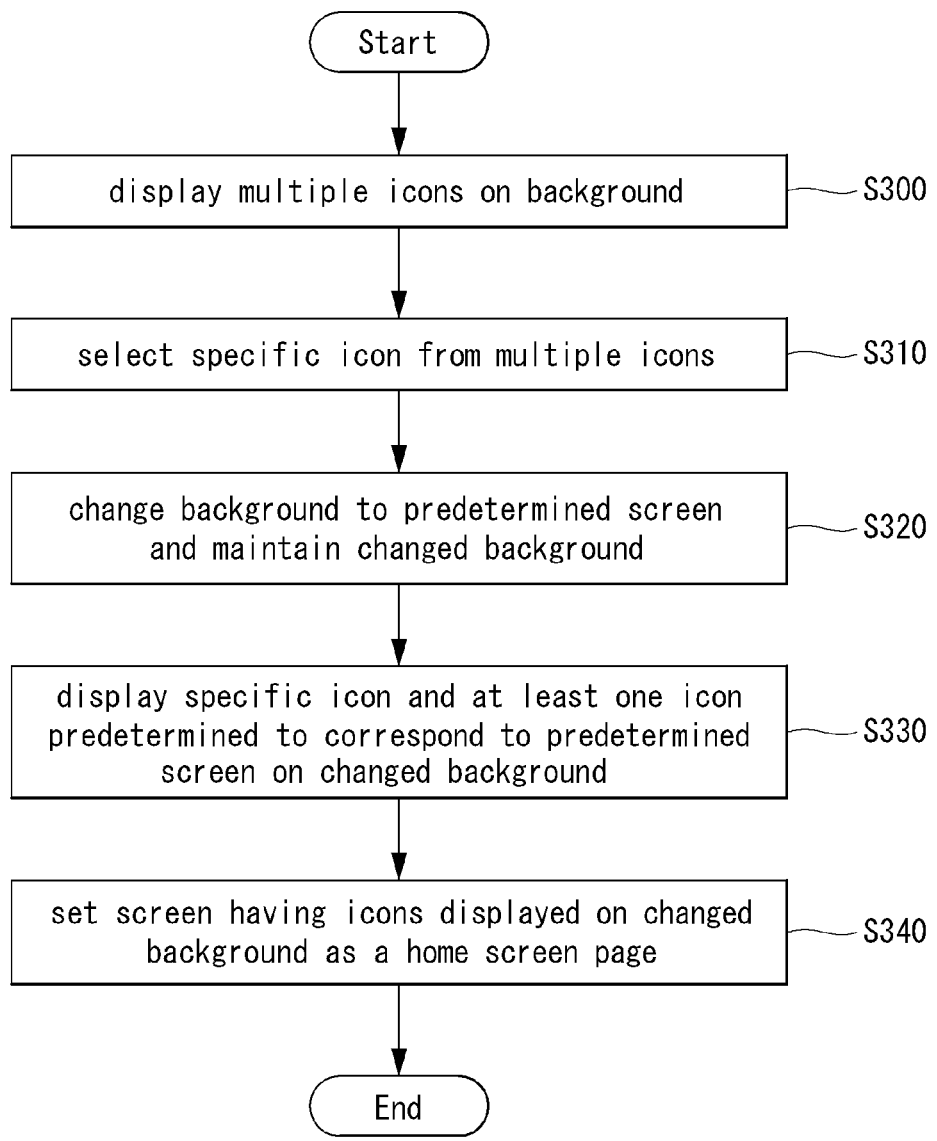
FIG. 15 is a flowchart illustrating a method of executing an application in the mobile terminal according to another embodiment of the present invention.

FIG. 15 is a flowchart illustrating a method of executing an application in the mobile terminal 100 according to another embodiment of the present invention.

A plurality of icons is displayed on the background S300. A specific icon is selected from the plurality of icons displayed on the background (S310). Then, the controller 180 of the mobile terminal 100 changes the background to a background predetermined for the specific icon and maintains the changed background (S320). For example, the controller 180 can maintain the changed background even when selection of the specific icon is cancelled. Here, the predetermined background may be an execution screen for a predetermined application or a predetermined screen for providing information used in connection with an application corresponding to the specific icon.

The controller 180 can change the changed background to a different background when a control signal for changing the changed background is input thereto. Detailed examples of changing the changed background to a different background are described.

When an icon other than the specific icon is displayed on the changed background and the user selects the other icon, the controller 180 can change the changed background to a predetermined different background corresponding to the other icon. As described above, the predetermined different background may be an execution screen for a predetermined application corresponding to the other icon or a predetermined screen for providing information used in connection with an application corresponding to the other icon.

When the user pushes a hardware button for page change or touches a soft key displayed on the display module 151 in the state that the background has been changed, the controller 180 can change the changed background to a background corresponding to a changed page. In this case, icons displayed on the background are also changed to icons corresponding to the changed page.

The mobile terminal 100 may include an additional hardware button used to perform a function of restoring the changed background to the default background or give the function to a specific button in the case that the background has been changed. Accordingly, the user can restore the changed background to the default background by pushing the hardware button.

Furthermore, when the background is changed according to selection of a specific icon, the controller 180 can display a soft key for restoring the changed background to the default background on the changed background. Accordingly, the user can restore the changed background to the default background by touching the soft key. In this case, it is assumed that the display module 151 is implemented as a touch screen.

Referring back to FIG. 15, the controller 180 displays the specific icon and at least one icon, which is predetermined to correspond to the changed predetermined background, on the changed predetermined background (S330). Here, the at least one icon may be an icon of an application relating to the changed background.

For example, if the application corresponding to the specific icon is the call send application, the changed background may be the contact application execution screen and the at least one icon may be an icon corresponding to an E-mail application that has a high possibility of using information relating to the contact application and an icon corresponding to a messaging application.

The controller 180 can set the screen having the plurality of icons displayed on the changed background as a home screen page (S340). Then, the user can execute applications relating to the changed background using information provided through the changed background on the set home screen page.

Figure 16:
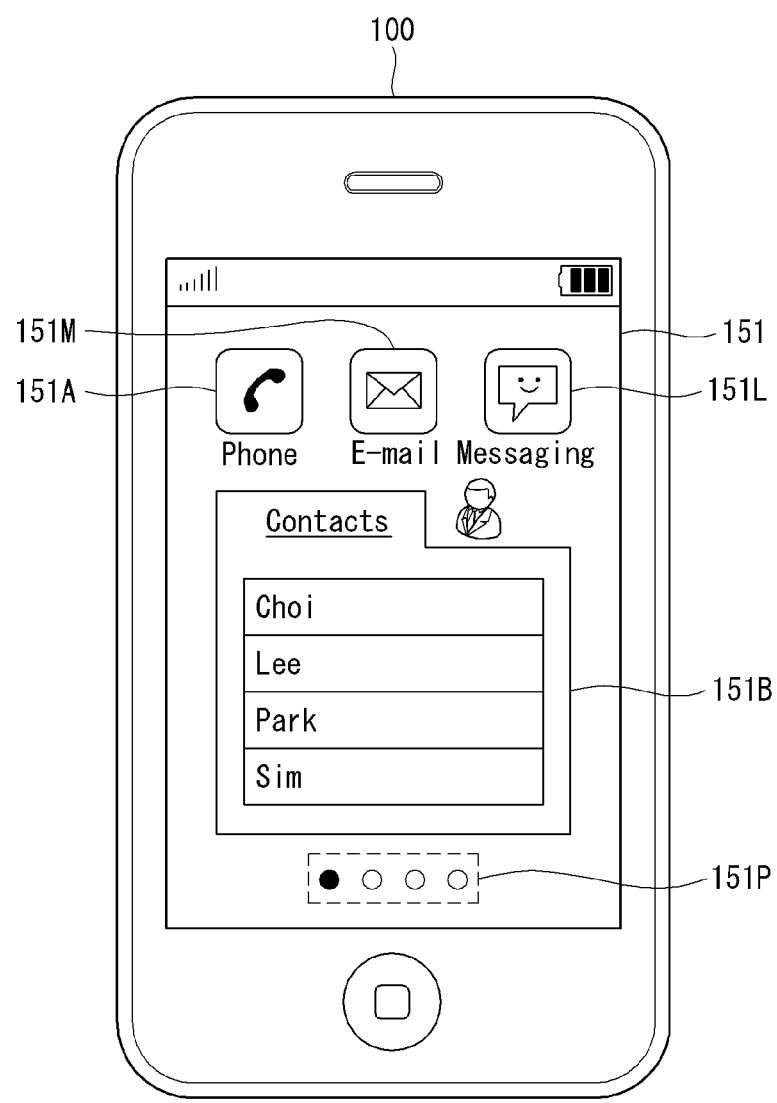
FIG. 16 shows display of a plurality of icons on a changed background when a specific icon is selected according to the application execution method of the mobile terminal shown in FIG. 15.

FIG. 16 shows a plurality of icons displayed on the changed background when a specific icon is selected according to the application execution method of the mobile terminal 100, shown in FIG. 15. Specifically, FIG. 16 shows that the background is changed to the contact application execution screen 151B according to selection of the call send application icon 151A, shown in FIG. 3, by the user and a plurality of icons 151A, 151L and 151M are displayed on the changed background.

Referring to FIG. 16, the call send application icon 151A, an E-mail application icon 151M and a messaging application icon 151L which are predetermined for the contact application are displayed on the changed background. Here, the E-mail application icon 151M is included in the home screen page shown in FIG. 3 whereas the messaging application icon 151L is not included in the home screen page shown in FIG. 3. That is, the controller 180 can display application icons included in other home screen pages as well as the home screen page displaying the call send application icon 151A on the changed background according to the application execution method shown in FIG. 15.

Comparing home screen page display regions 151P shown in FIGS. 3 and 16 to each other, it can be known that there are 3 home screen pages in the case of FIG. 3 whereas there are 4 home screen pages in the case of FIG. 16. This is because the screen having the icons 151A, 151L and 151M displayed on the changed background is set as an additional home screen page so as to increase the number of home screen pages.

Figure 17:
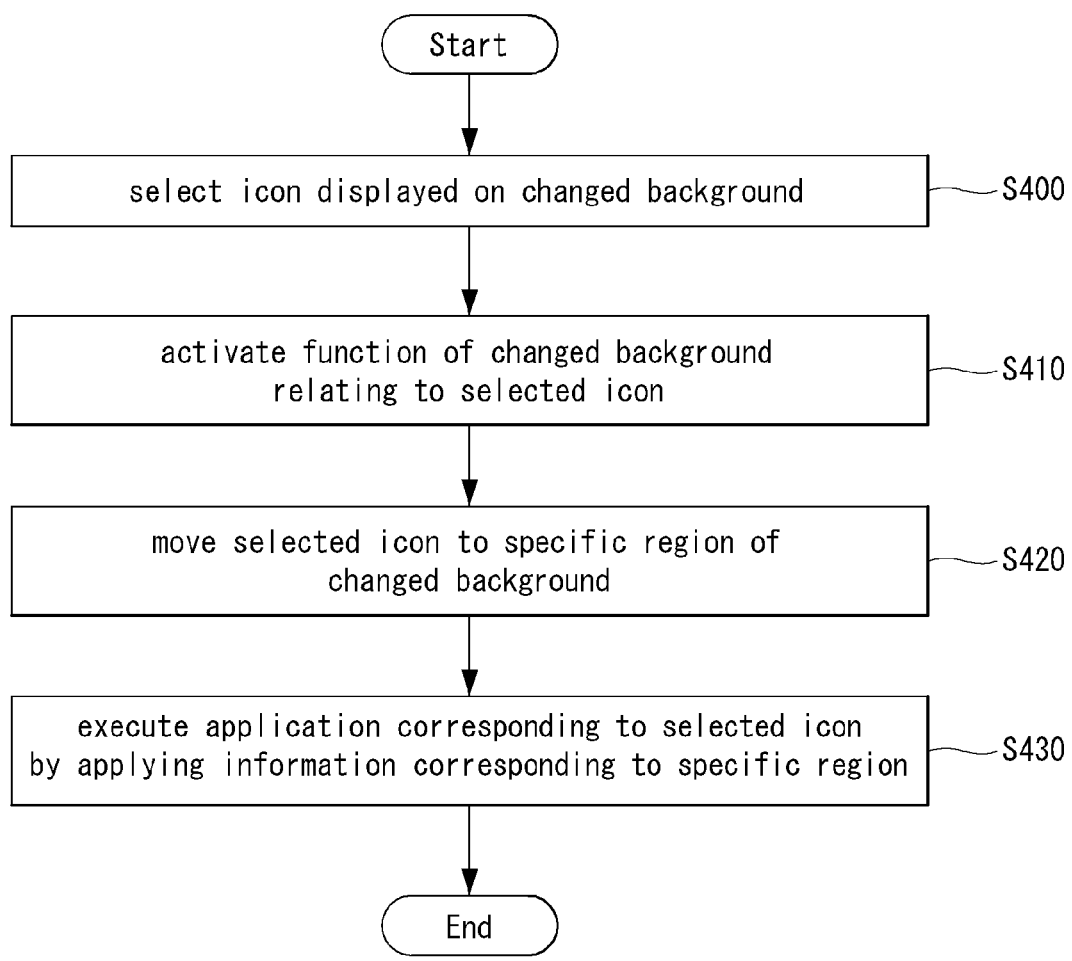
FIG. 17 is a flowchart illustrating a method of executing an application in the mobile terminal according to another embodiment of the present invention.

FIG. 17 is a flowchart illustrating a method of executing an application in the mobile terminal 100 according to another embodiment of the present invention. Specifically, FIG. 17 illustrates a procedure of executing an application corresponding to an icon selected from a plurality of icons displayed on the changed background according to the application execution method shown in FIG. 15.

The user selects one of the plurality of icons displayed on the changed background (S400). Then, the controller 180 of the mobile terminal 100 activates a function of the changed background, which corresponds to the selected icon (S410). This means that the changed background is maintained in a deactivated state until one of the plurality of icons is selected.

Here, the function of the changed background, which corresponds to the selected icon, may be a function of executing an application corresponding to the selected icon using information relating to a specific region when the selected icon is moved to the specific region of the changed background. Otherwise, the function of the changed background, which corresponds to the selected icon, may be a function of executing a specific function of a specific application corresponding to a specific region using information relating to the selected icon when the selected icon is moved to the specific region of the changed background.

If the display module 151 of the mobile terminal 100 is implemented as a touch screen, a function corresponding to a touched region is not executed unless the one of the icons is selected even when the user touches the touch screen 151. Furthermore, when an icon other than icons predetermined for the changed background from among the plurality of icons displayed on the changed background is moved to a specific region of the changed background, an application corresponding to the other icon is not executed.

After activation of the function of the changed background, which relates to the selected icon, the selected icon is moved to a specific region of the changed background (S420). Then, the controller 180 executes an application corresponding to the selected icon using information corresponding to the specific region (S430).

Figure 18:
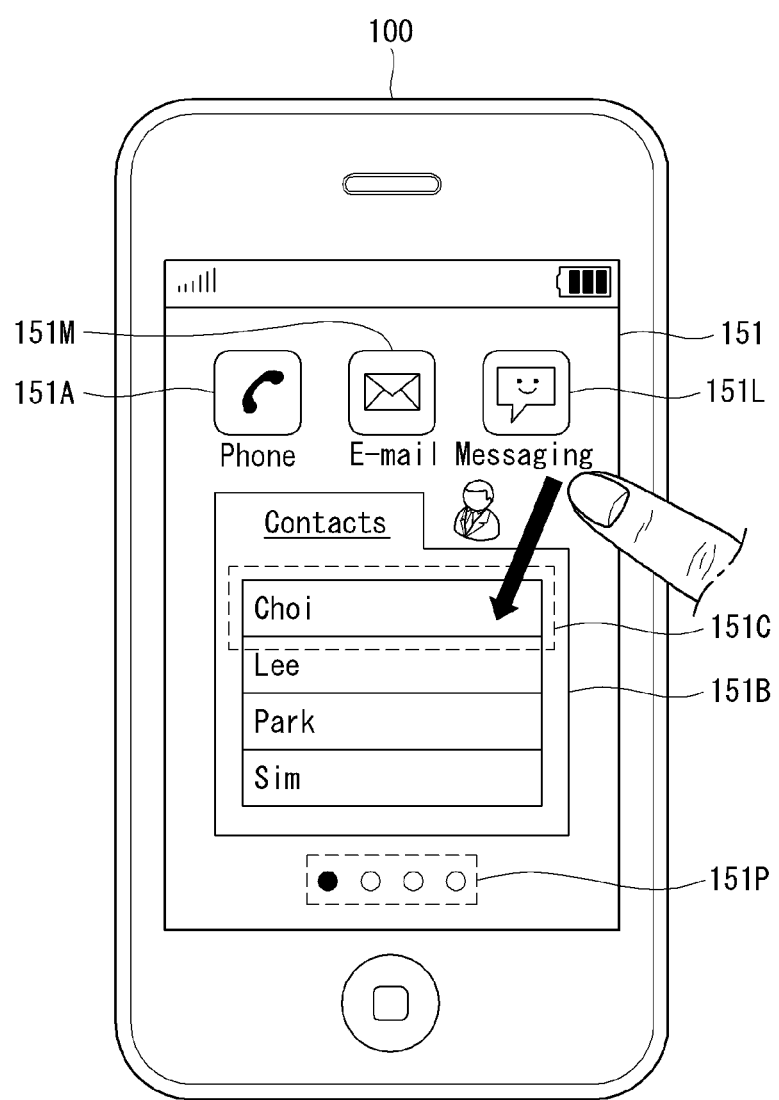
FIGS. 18 and 19 illustrate a procedure of executing a messaging application according to the application execution method of the mobile terminal shown in FIG. 17.
Figure 19:
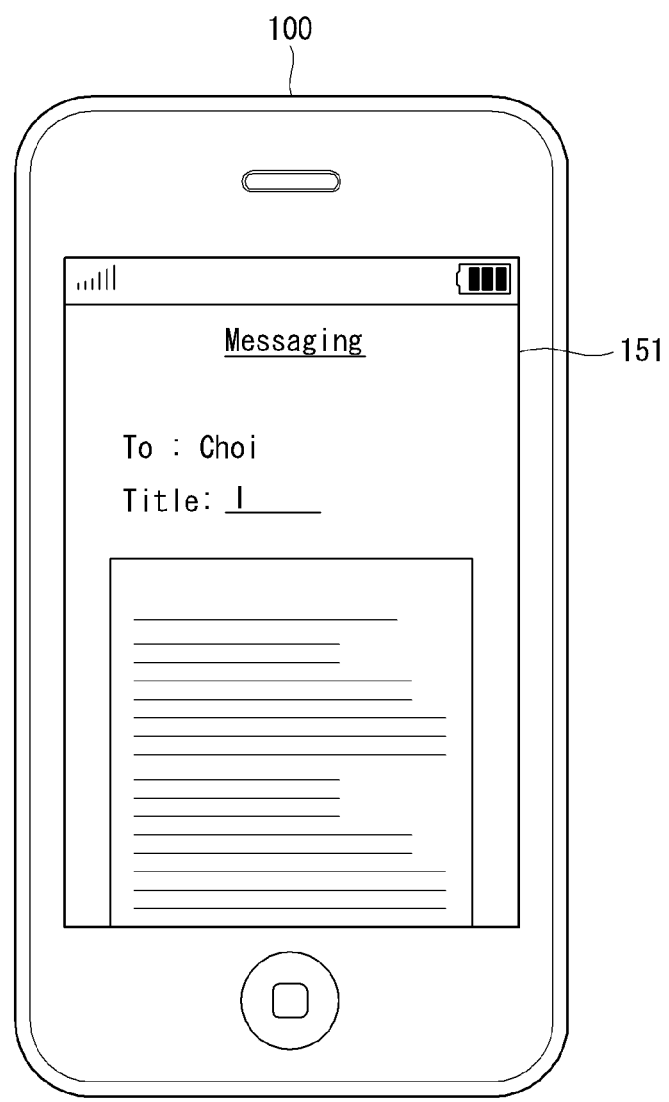

FIGS. 18 and 19 illustrate a procedure of executing the messaging application according to the application execution method of the mobile terminal 100 shown in FIG. 17.

In the state that the contact application execution screen 151B is displayed on the background according to the application execution method shown in FIG. 15, the user moves the messaging application icon 151L to the specific region 151C of the contact application, as shown in FIG. 18. Then, the controller 180 executes the messaging application and displays a screen for creating a message to be sent to a contact corresponding to the specific region 151C on the display module 151, as shown in FIG. 19.

Figure 20:
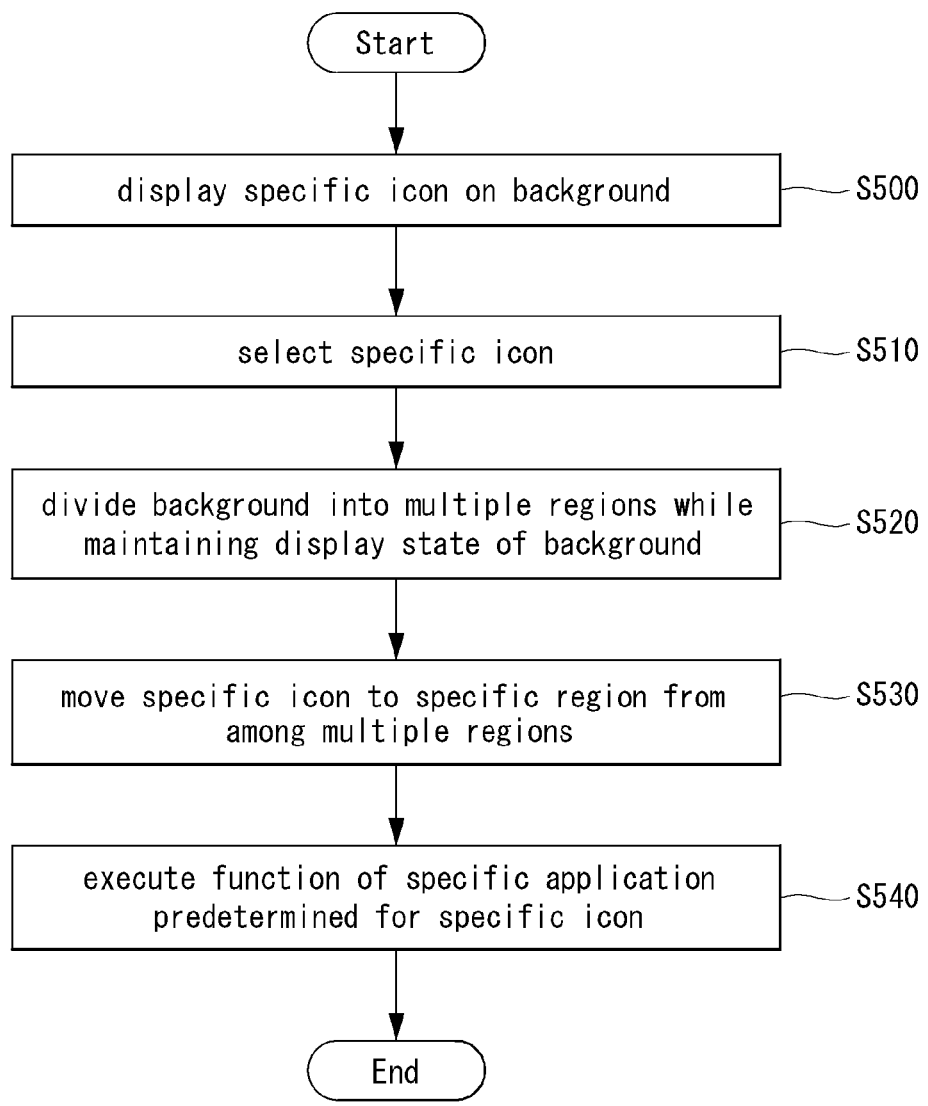
FIG. 20 is a flowchart illustrating a method of executing an application in the mobile terminal according to another embodiment of the present invention.

FIG. 20 is a flowchart illustrating a method of executing an application in the mobile terminal 100 according to another embodiment of the present invention.

A specific icon is displayed on the background of the display module 151 of the mobile terminal 100 (S500). The specific icon is selected (S510). Then, the controller 180 of the mobile terminal 100 divides the background into a plurality of regions while maintaining the display state of the background (S520). The controller 180 may maintain the display state of other icons that have been displayed on the background before the specific icon is selected while dividing the background into the plurality of regions.

The controller 180 can maintain the divided background only when the specific icon is selected and restore the divided background to the default background upon cancellation of selection of the specific icon. That is, the controller 180 can activate the function of the background relating to the application execution method of FIG. 20 only when the specific icon is selected. In addition, the controller 180 may visually display the divided regions of the background or not.

The selected specific icon is moved a specific region from among the plurality of regions (S530). Then, the controller 180 executes a function of a specific application predetermined for the specific icon (S540). Here, the controller 180 can display the specific region such that the specific region is visually distinguished from other regions.

In the application execution method shown in FIG. 20, the specific icon may be an icon corresponding to a specific application or an icon corresponding to a specific file. Procedures of executing applications when the specific icon is an icon corresponding to a specific application will be described with reference to FIGS. 21 to 31.

Figure 21:
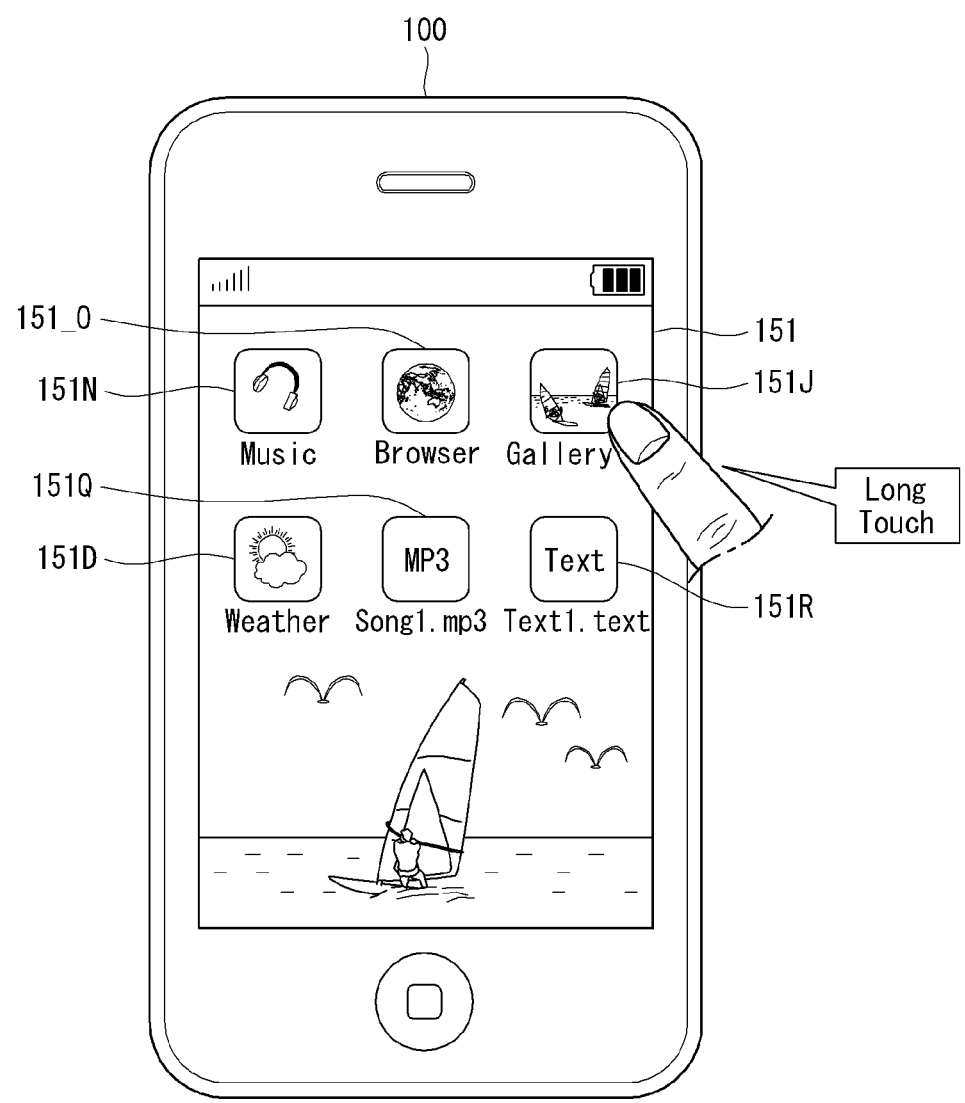
FIGS. 21, 22 and 23 illustrate a procedure of executing a gallery application according to the application execution method of the mobile terminal shown in FIG. 20.
Figure 22:
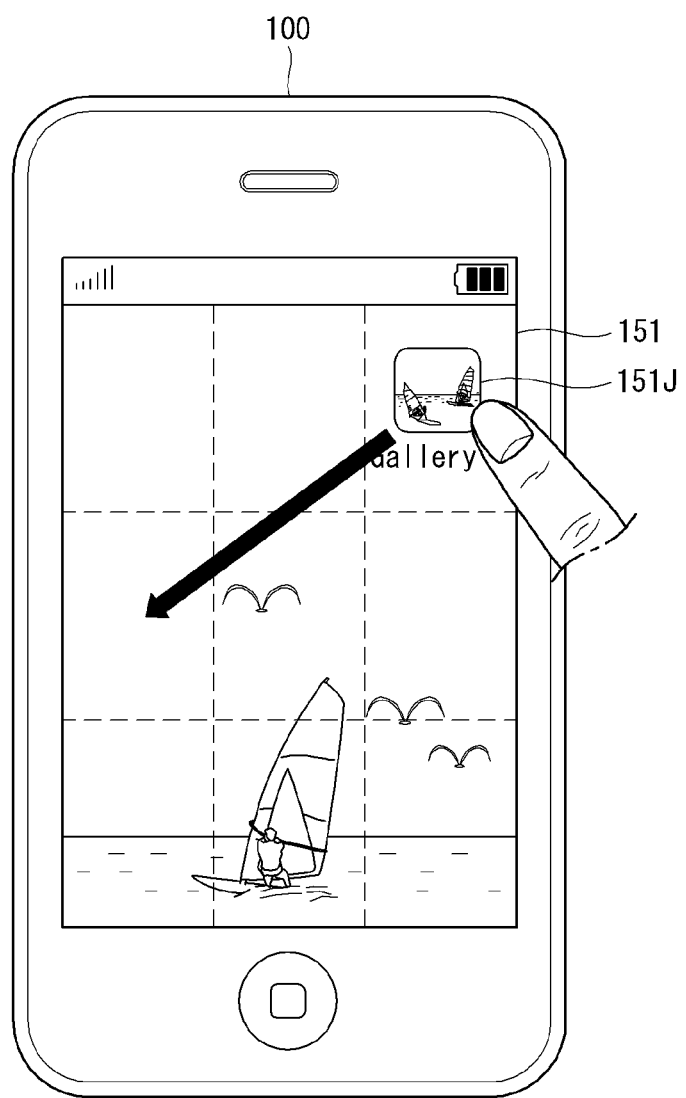
Figure 23:
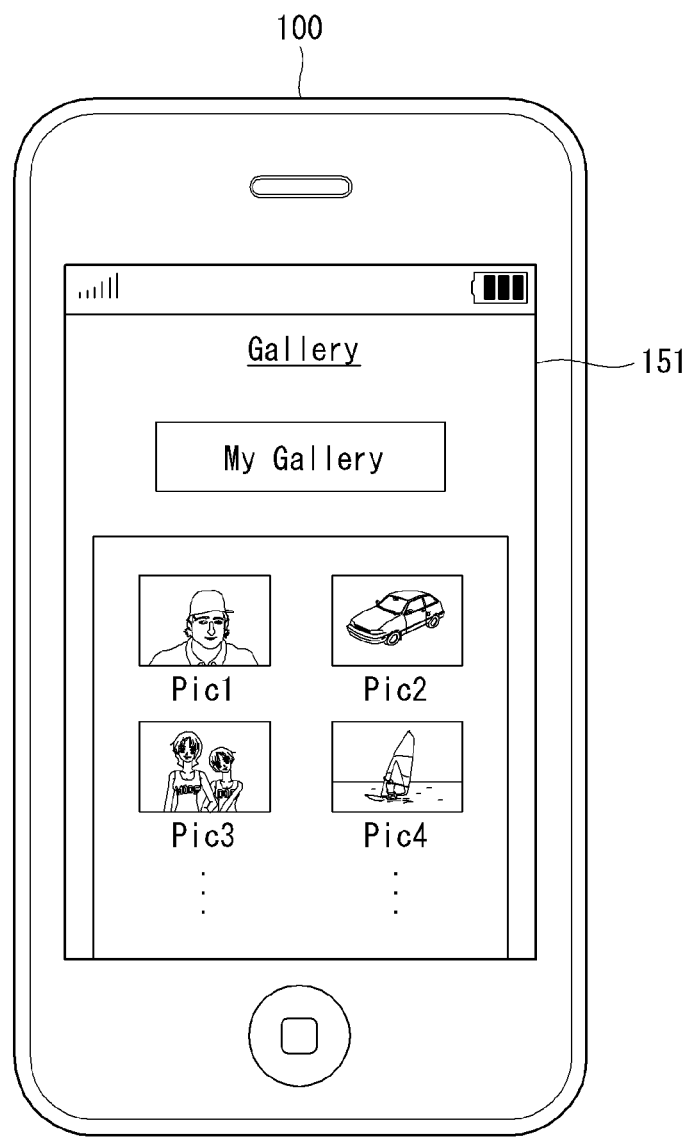

FIGS. 21, 22 and 23 illustrate a procedure of executing the gallery application according to the application execution method of the mobile terminal 100, shown in FIG. 20.

Referring to FIG. 21, the user selects the gallery application icon 151J from a plurality of icons displayed on the background by long-touching it. Then, the controller 180 of the mobile terminal 100 divides the background into a plurality of regions while maintaining the display state of the background, as shown in FIG. 22. Alternatively, the controller 180 can maintain the display state of the icons that have been displayed on the background before the gallery application icon 151J is selected even when the background is divided into the plurality of regions. This can be applied to procedures shown in FIGS. 24, 26 and 28 which will be described later.

The user moves the gallery application icon 151J to a specific region from among the plurality of regions, as shown in FIG. 22. Then, the controller 180 executes a 'My gallery view function' from among functions of the gallery application, which corresponds to the specific region, as shown in FIG. 23. That is, the mobile terminal 100 according to the present invention can perform an additional image view function with respect to a basic image view function provided by the gallery application.

Upon completion of execution of the 'My gallery view function' shown in FIG. 23, the controller 180 can restore the divided background to the default background shown in FIG. 21.

According to the procedure illustrated in FIGS. 21, 22 and 23, a personal information protection level of the user may become higher than a protection level according to a normal method such as a method of inputting a password because a possibility that a stranger does not know contents the user wants to keep secret is high while the stranger can be aware of the contents according to the protection method using a password.

Figure 24:
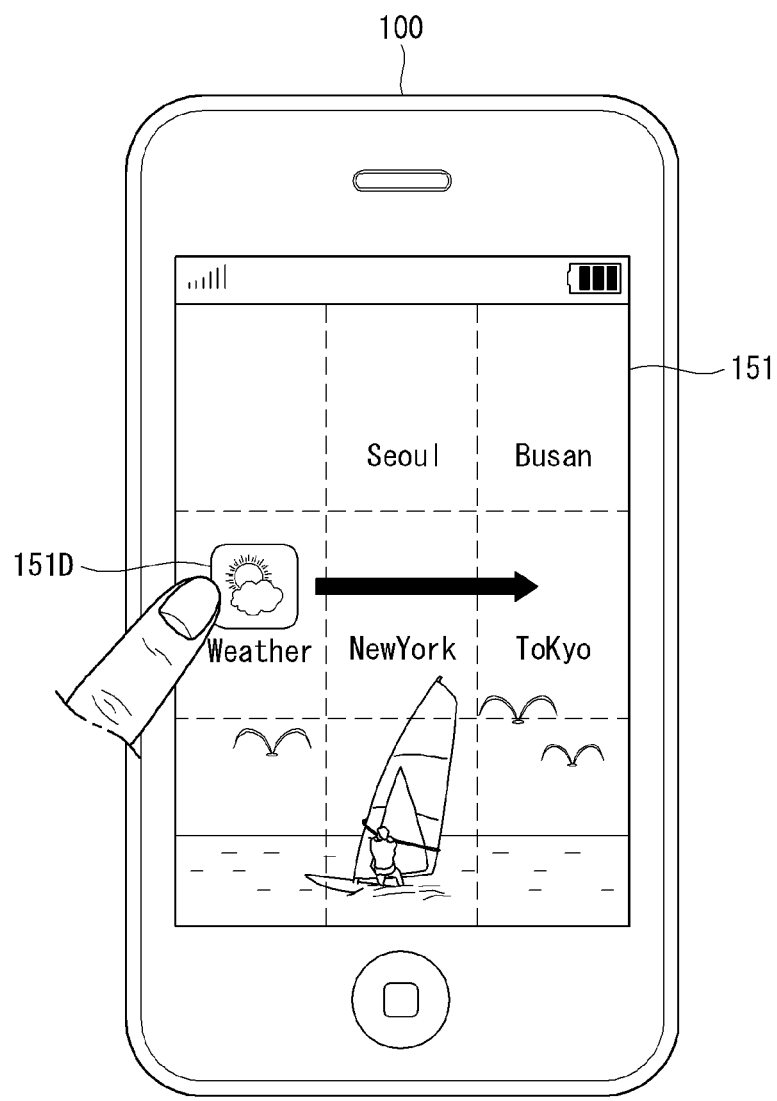
FIGS. 24 and 25 illustrate a procedure of executing a weather application according to the application execution method of the mobile terminal shown in FIG. 20.
Figure 25:
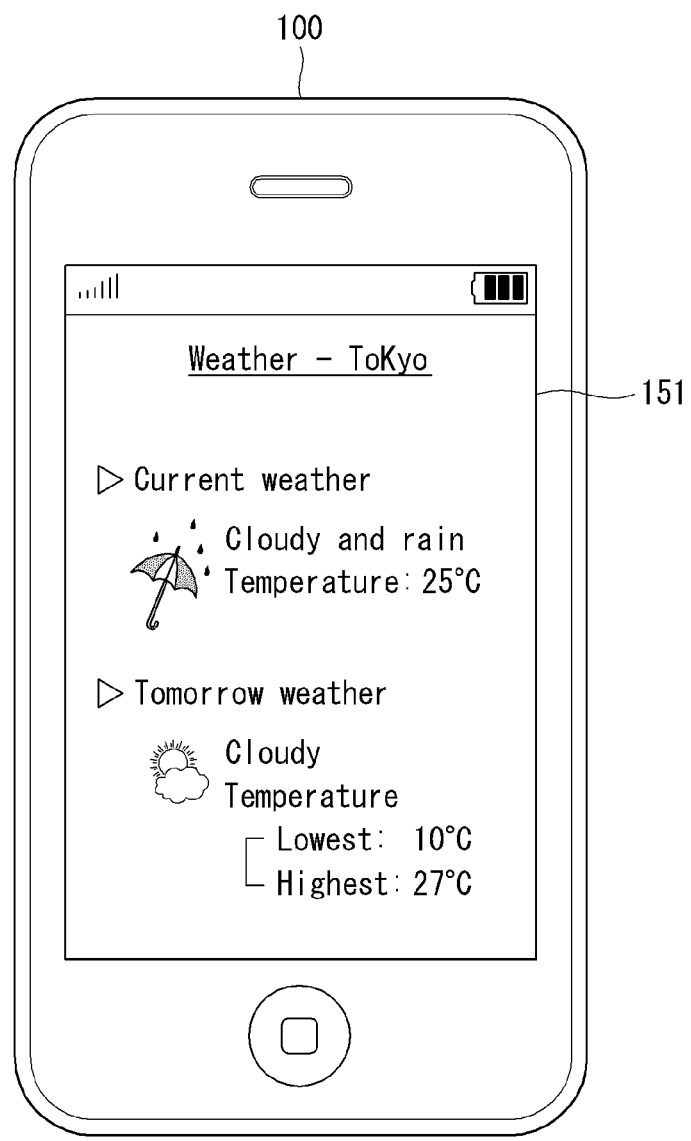

FIGS. 24 and 25 illustrate a procedure of executing the weather application according to the application execution method of the mobile terminal 100, shown in FIG. 20. FIG. 24 shows that the background is divided into the plurality of regions according to selection of the weather application icon 151D, shown in FIG. 21, by the user and some of the plurality of regions are allocated to perform a specific function of the weather application. Here, the specific function of the weather application may be a function of providing weather information about areas displayed on the regions.

Referring to FIG. 24, letters indicating specific areas as an identification means corresponding to the specific function of the weather application are displayed on the regions allocated to perform the specific function. Alternatively, the identification means may be a numeral, a symbol, an icon, etc., or a combination thereof. However, the scope of the present invention is not limited thereto.

On the divided background, the user moves the weather application icon 151D to a region corresponding to Tokyo, as shown in FIG. 24. Then, the controller 180 executes the weather application and displays weather information about Tokyo on the display module 151, as shown in FIG. 25.

Figure 26:
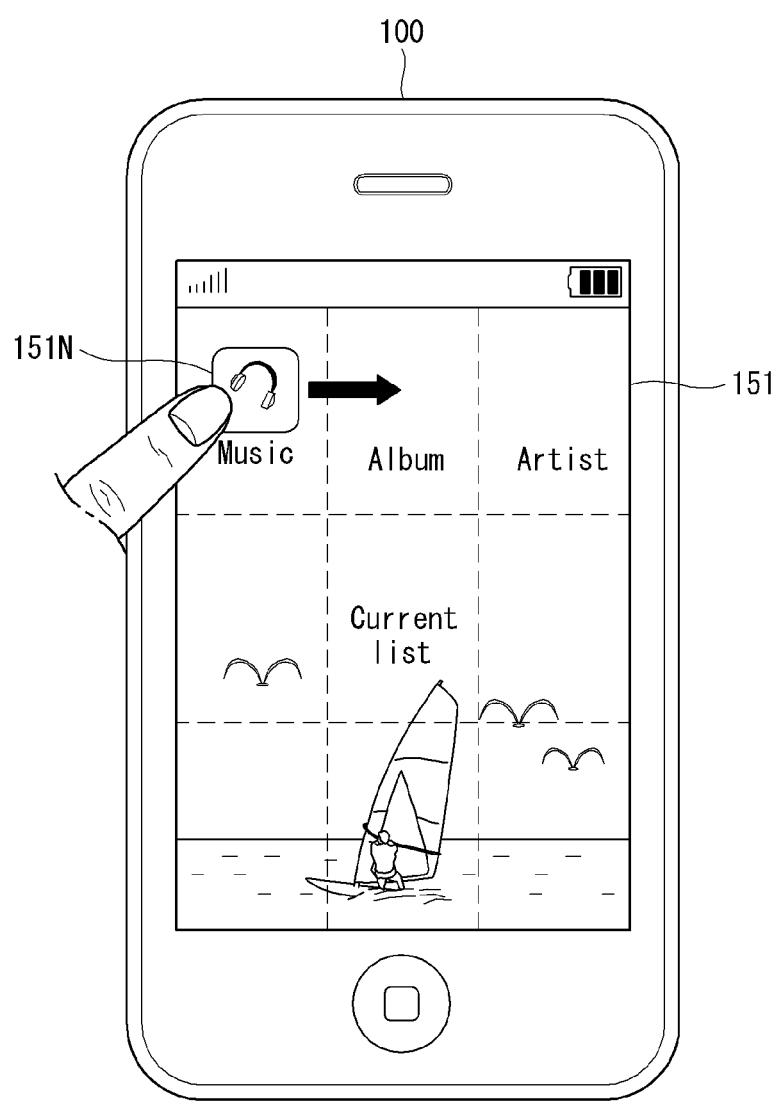
FIGS. 26 and 27 illustrate a procedure of executing a music play application according to the application execution method of the mobile terminal shown in FIG. 20.
Figure 27:
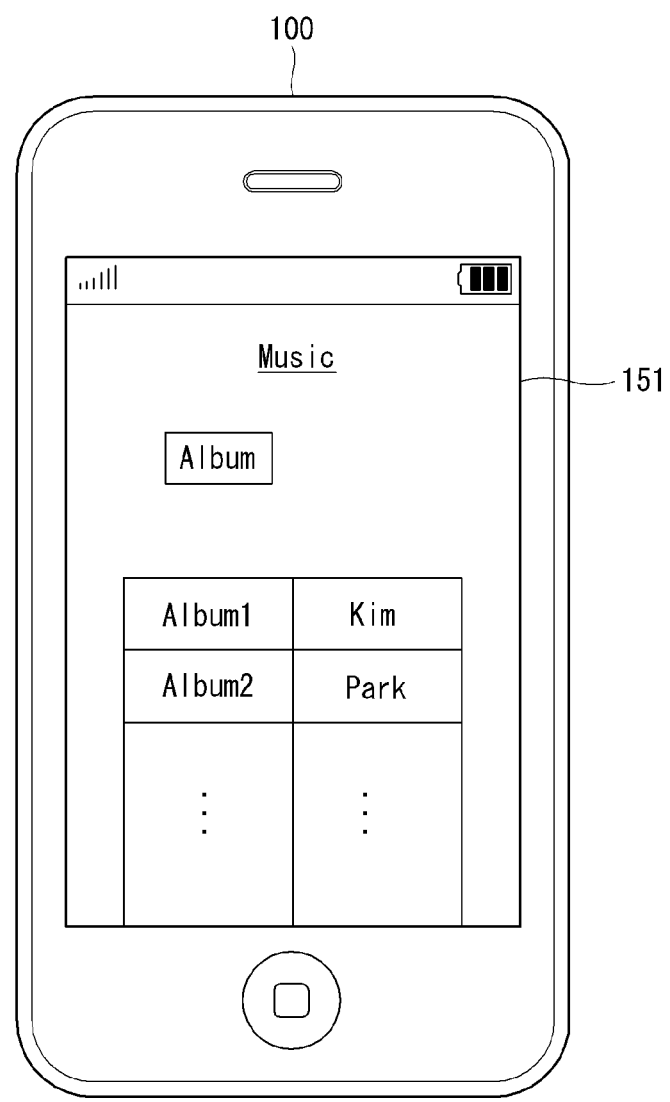

FIGS. 26 and 27 illustrate a procedure of executing the music play application according to the application execution method of the mobile terminal 100, shown in FIG. 20. FIG. 26 shows that the background is divided into the plurality of regions according to selection of a music play application icon 151N, shown in FIG. 21, by the user and some of the plurality of regions are allocated to perform a specific function of the music play application.

Here, the specific function of the music play application may correspond to execution of a sub-menu which can be performed in the music player application. Referring to FIG. 26, letters corresponding to the sub-menu of the music play application are displayed on the regions allocated to perform the specific function.

On the divided background, the user moves the music play application icon 151N to a region corresponding to an album menu, as shown in FIG. 26. Then, the controller 180 executes the music play application and displays an album menu execution result on the display module 151, as shown in FIG. 27.

Figure 28:
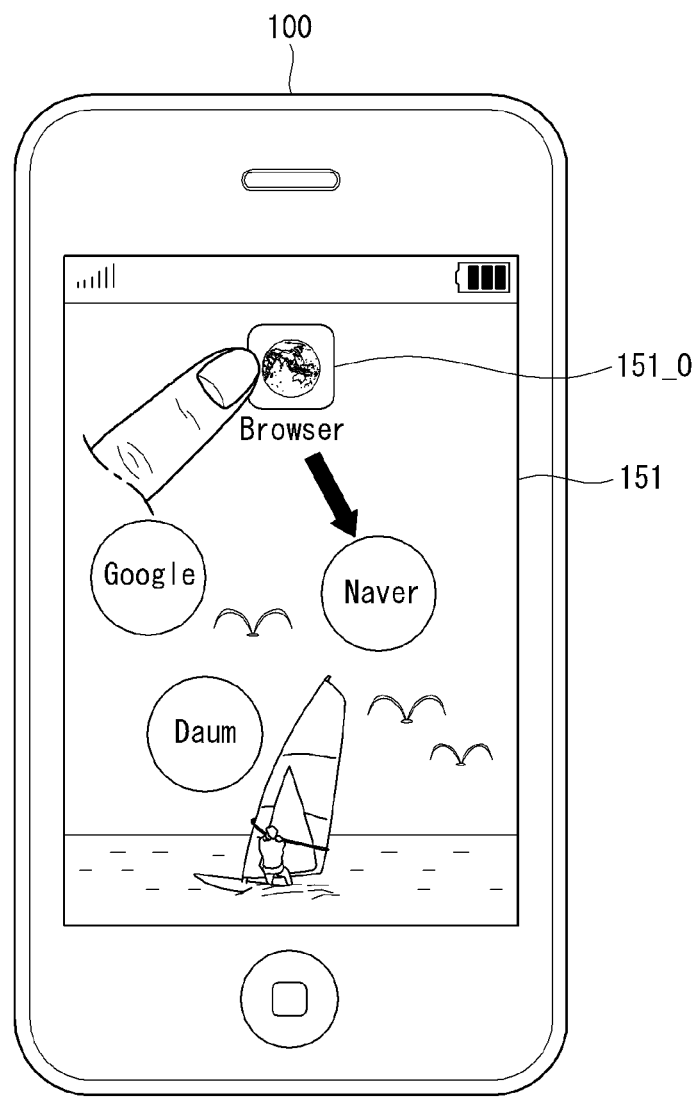
FIGS. 28 and 29 illustrate a procedure of executing a web browsing application according to the application execution method of the mobile terminal shown in FIG. 20.
Figure 29:
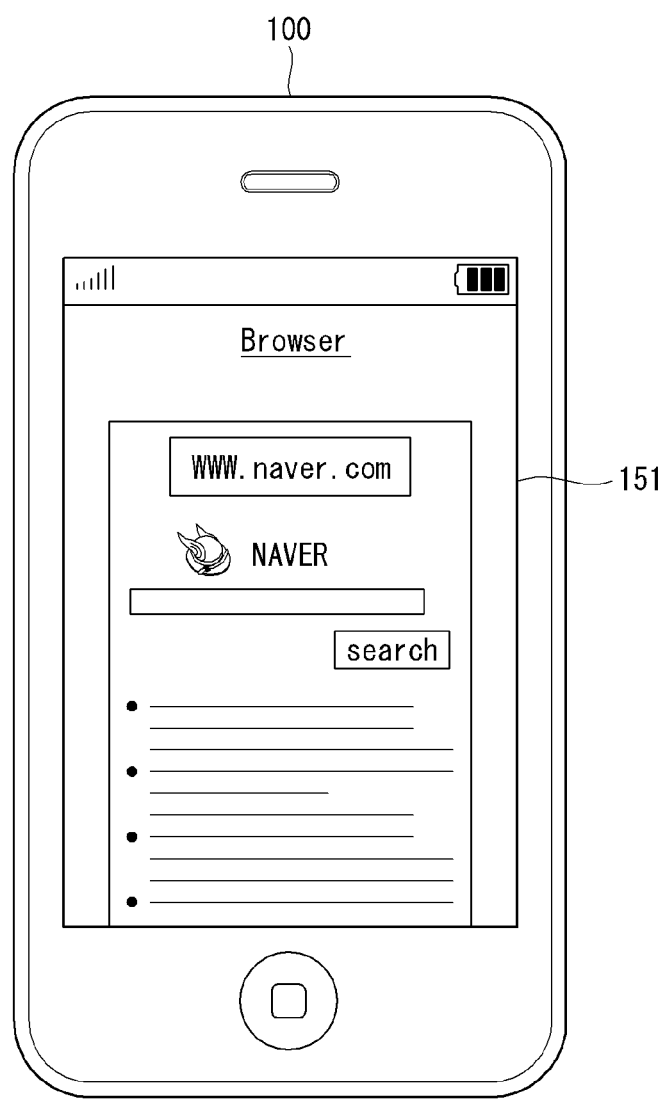

FIGS. 28 and 29 illustrate a procedure of executing the web browsing application according to the application execution method of the mobile terminal 100, shown in FIG. 20. FIG. 28 shows that the background is divided into the plurality of regions according to selection of a web browsing application icon 151_O, shown in FIG. 21, by the user and some of the plurality of regions are allocated to perform a specific function of the web browsing application.

Here, the specific function of the web browsing application may be a function of accessing a site predetermined in the web browsing application. Referring to FIG. 28, letters corresponding to the site predetermined in the web browsing application are displayed on the regions allocated to perform the specific function.

On the divided background, the user moves the web browsing application icon 151_O to a region corresponding to 'Naver', as shown in FIG. 28. Then, the controller 180 executes the web browsing application and displays a 'Naver' access result on the display module 151, as shown in FIG. 29.

Figure 30A:
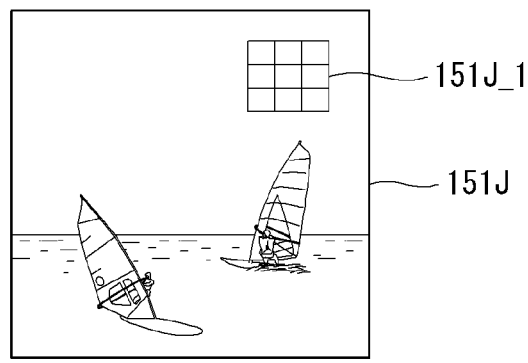
FIGS. 30A through 30C show examples of display of identification means corresponding to icons displayed on the background according to the application execution method of the mobile terminal shown in FIG. 20.
Figure 30B:
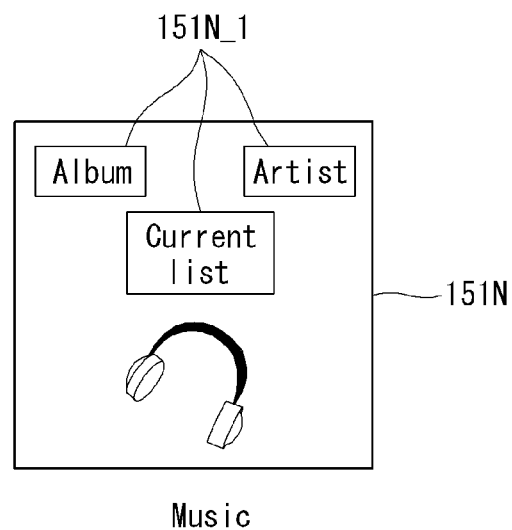
Figure 30C:
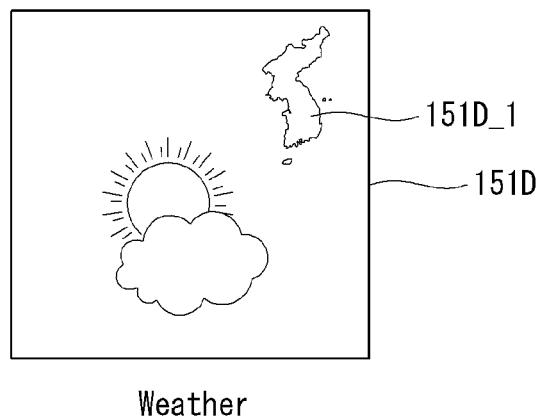

FIGS. 30A through 30C show examples of display of identification means corresponding to icons displayed on the background according to the application execution method of the mobile terminal 100, shown in FIG. 20.

Referring to FIG. 30A, the gallery application icon 151J can include an icon 151J_1 which represents that the background can be divided into a plurality of regions upon selection of the gallery application icon 151J and a specific function of the gallery application is allocated to a predetermined specific region from among the plurality of regions.

Referring to FIG. 30B, the music play application icon 151N can include a letter group 151N_1 which represents that the background can be divided into a plurality of regions upon selection of the music play application icon 151N and a specific function of the music play application is allocated to a predetermined specific region from among the plurality of regions.

Referring to FIG. 30C, the weather application icon 151D can include a map icon 151D_1 which represents that location information can be provided through a map on the background when the weather application icon 151D is selected.

Figure 31:
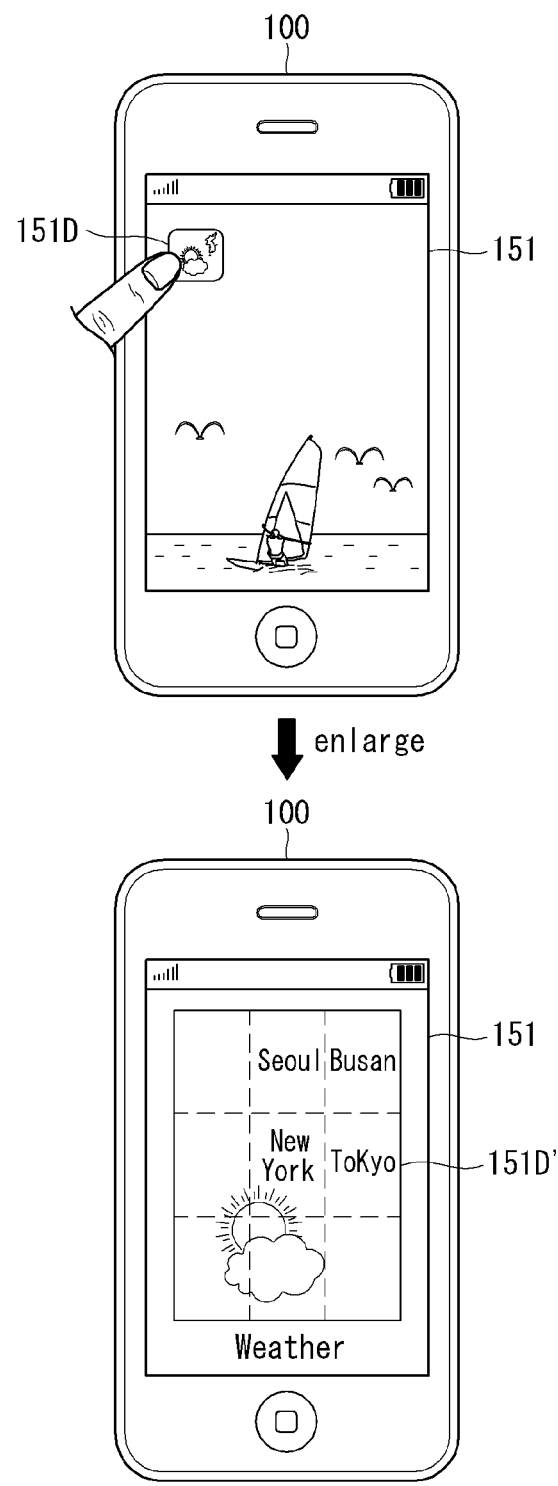
FIG. 31 shows an example of enlarging an icon displayed on the background according to the application execution method of the mobile terminal shown in FIG. 20.

FIG. 31 shows an example of enlarging an icon displayed on the background according to the application execution method of the mobile terminal 100, shown in FIG. 20. Referring to FIG. 31, when the user touches the weather application icon 151D on the background, the controller 180 of the mobile terminal 100 can enlarge the weather application icon 151D. The enlarged weather application icon 151D' can include specific area names which can be used for execution of the weather application.

Figure 32:
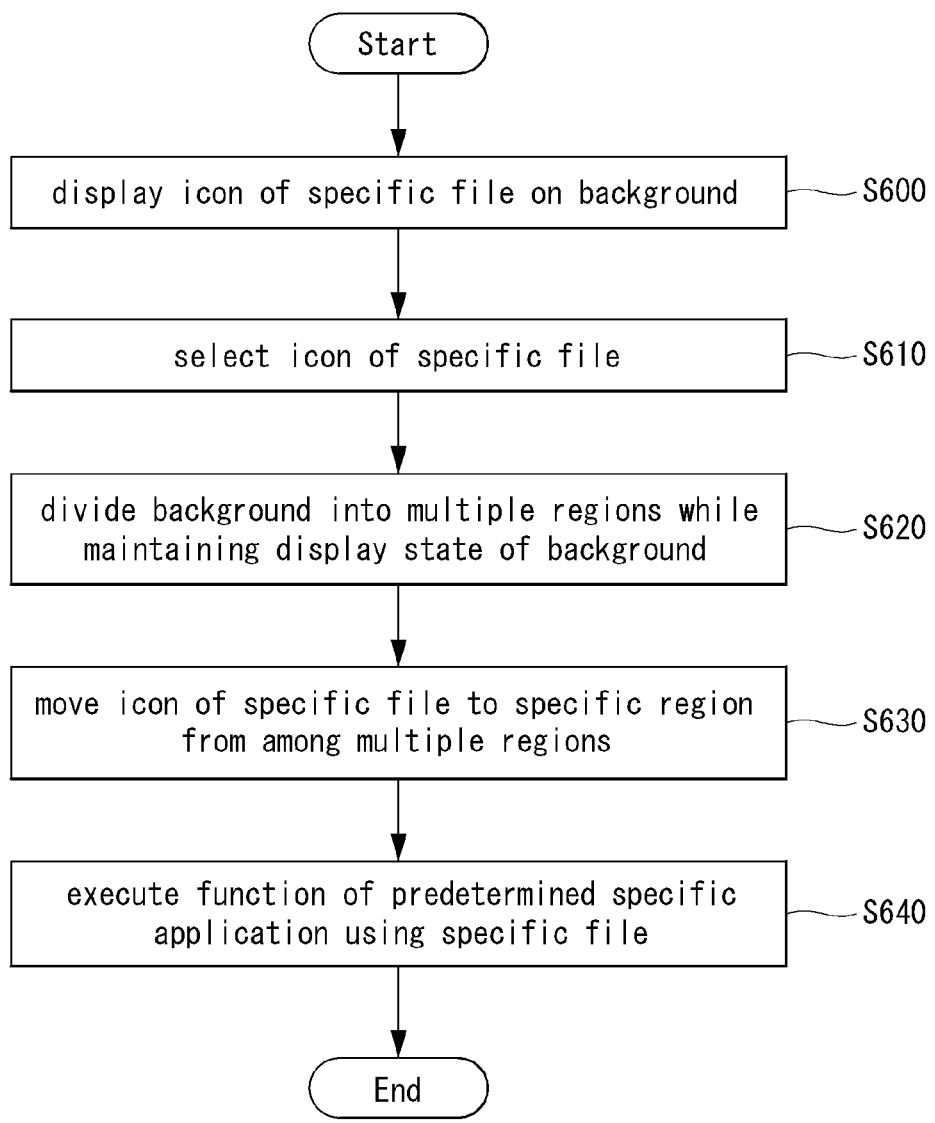
FIG. 32 is a flowchart illustrating a method of executing an application in the mobile terminal according to another embodiment of the present invention.

FIG. 32 is a flowchart illustrating a method of executing an application in the mobile terminal 100 according to another embodiment of the present invention. Particularly, FIG. 32 shows an example of the application execution method shown in FIG. 20 when the specific icon is an icon corresponding to a specific file.

An icon corresponding to a specific file is displayed on the background of the display module 151 of the mobile terminal 100 (S600). The icon corresponding to the specific file is selected (S610). Then, the controller 180 of the mobile terminal 100 divides the background into a plurality of regions while maintaining the display state of the background (S620). Alternatively, the controller 180 may maintain the display state of icons that have been displayed on the background before the specific file icon is selected.

The icon of the specific file is moved to a specific region from among the plurality of regions (S630). Then, the controller 180 executes a function of a predetermined specific application using the specific file (S640).

Figure 33:
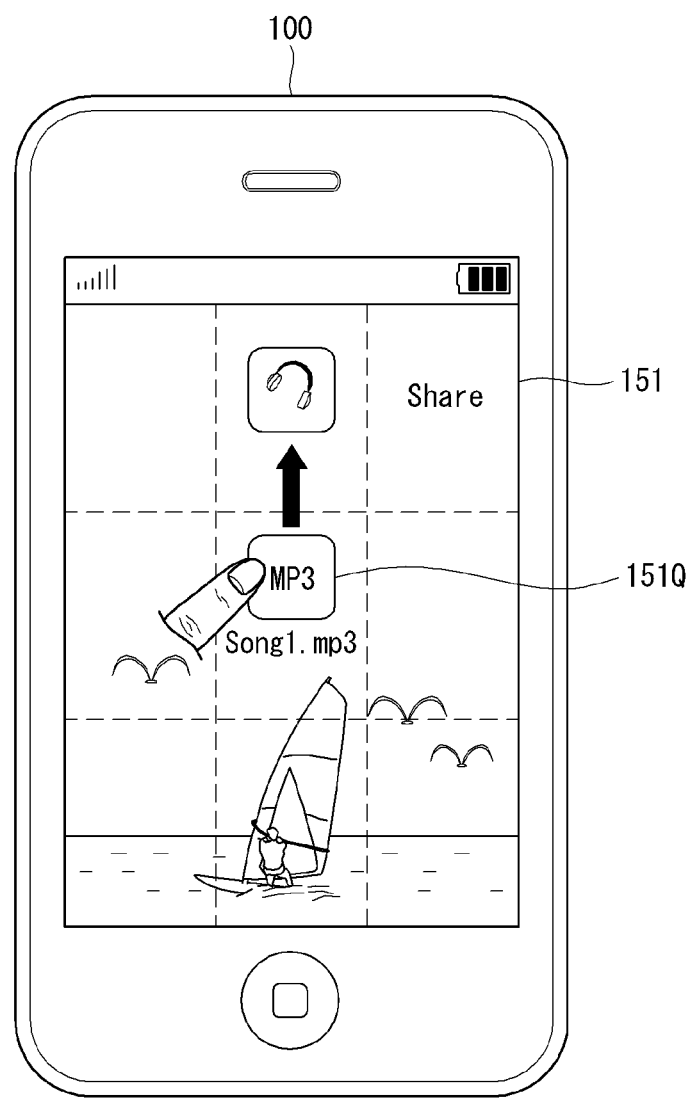
FIGS. 33 and 34 illustrate a procedure of executing an MP3 file displayed on the background according to the application execution method of the mobile terminal shown in FIG. 32.
Figure 34:
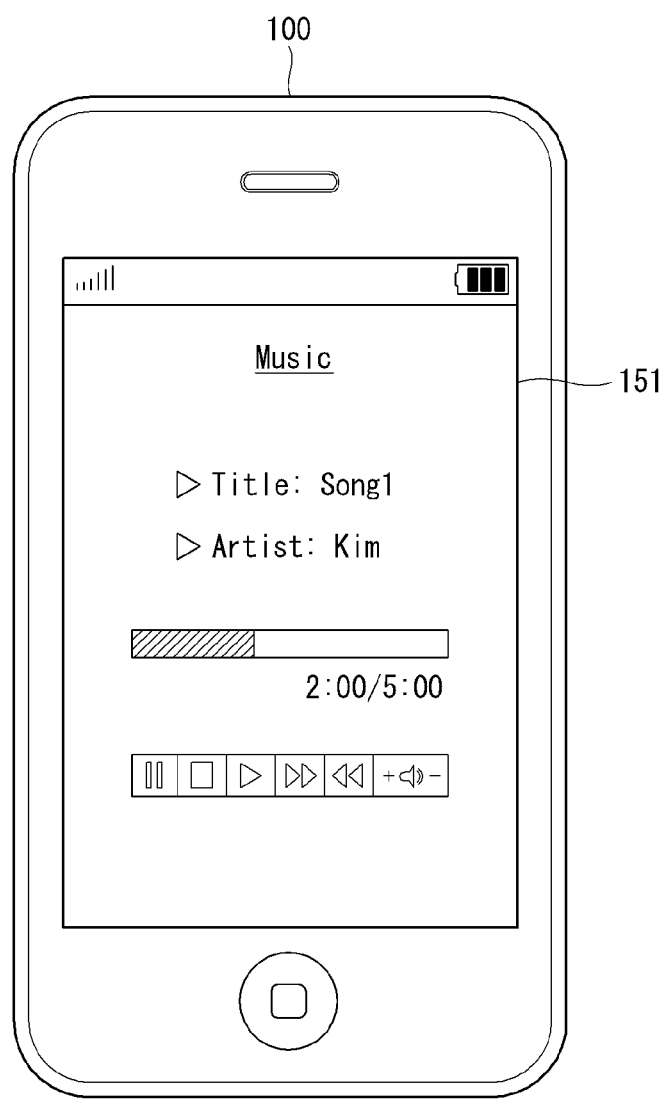

FIGS. 33 and 34 illustrate a procedure of executing an MP3 file whose icon 151_Q is displayed on the background according to the application execution method of the mobile terminal 100, shown in FIG. 32. FIG. 33 shows that the background is divided into a plurality of regions according to selection of the MP3 file icon 151_Q, shown in FIG. 21, by the user and some of the plurality of regions are allocated to execute a specific function of a predetermined specific application, which corresponds to the MP3 file.

Referring to FIG. 33, some of the plurality of regions display an icon for executing a predetermined music play application and a sharing function of an application for sharing the MP3 file.

On the background divided into the plurality of regions, the user moves the MP3 file icon 151_Q to a region in which the music play application icon is displayed, as shown in FIG. 33. Then, the controller 180 executes the music play application to reproduce the MP3 file, as shown in FIG. 34.

Figure 35:
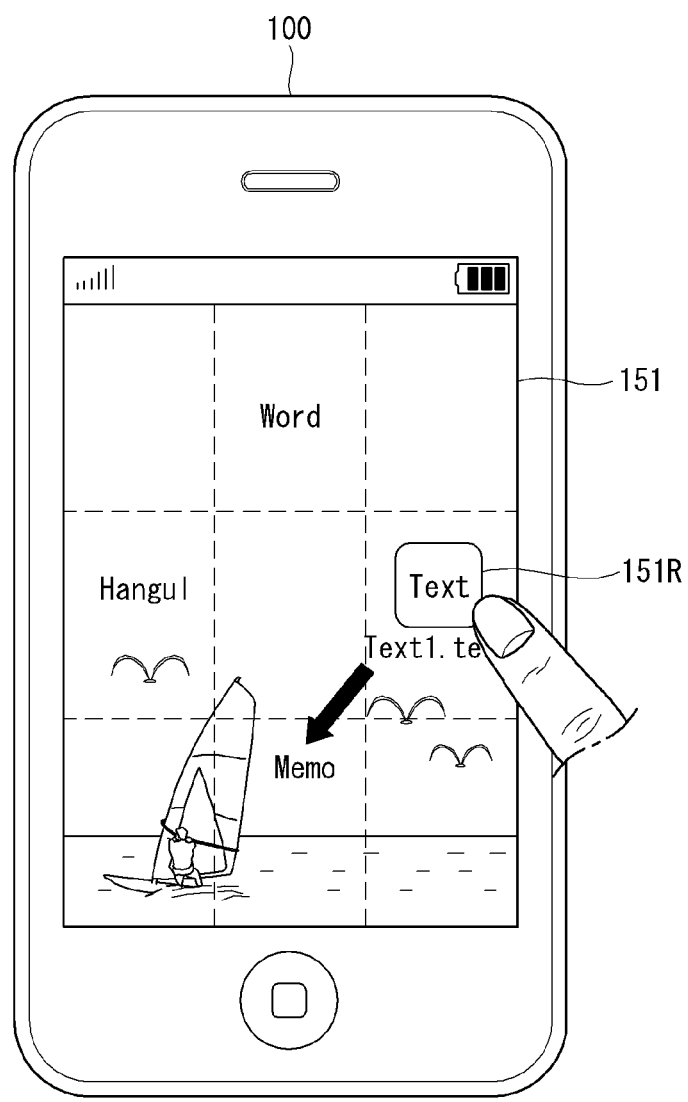
FIGS. 35 and 36 illustrate a procedure of executing a text file displayed on the background according to the application execution method of the mobile terminal shown in FIG. 32.
Figure 36:
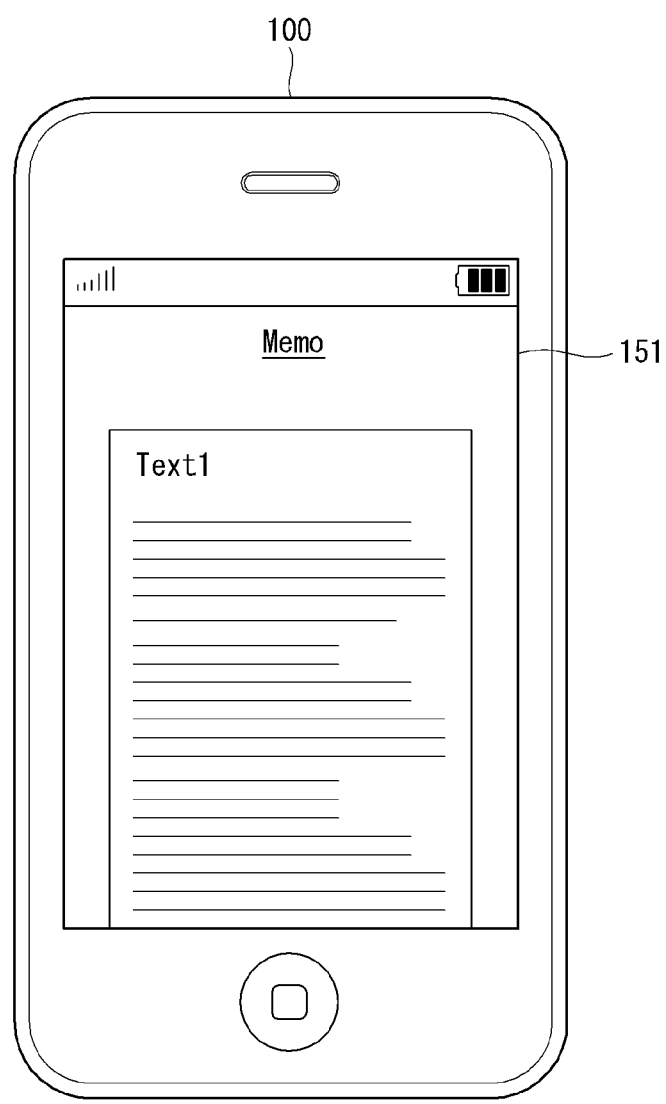

FIGS. 35 and 36 illustrate a procedure of executing a text file whose icon 151R is displayed on the background according to the application execution method of the mobile terminal 100, shown in FIG. 32. FIG. 35 shows that the background is divided into a plurality of regions according to selection of the text file icon 151R, shown in FIG. 21, by the user and some of the plurality of regions are allocated to execute a specific function of a predetermined specific application, which corresponds to the text file.

Referring to FIG. 35, some of the plurality of regions display predetermined letters indicating a Hangul application, predetermined letters indicating a word application and predetermined letters indicating the memo application.

On the background divided into the plurality of regions, the user moves the text file icon 151R to a region in which the letters representing the memo application icon are displayed, as shown in FIG. 35. Then, the controller 180 executes the memo application to execute the text file, as shown in FIG. 36.

Figure 37:
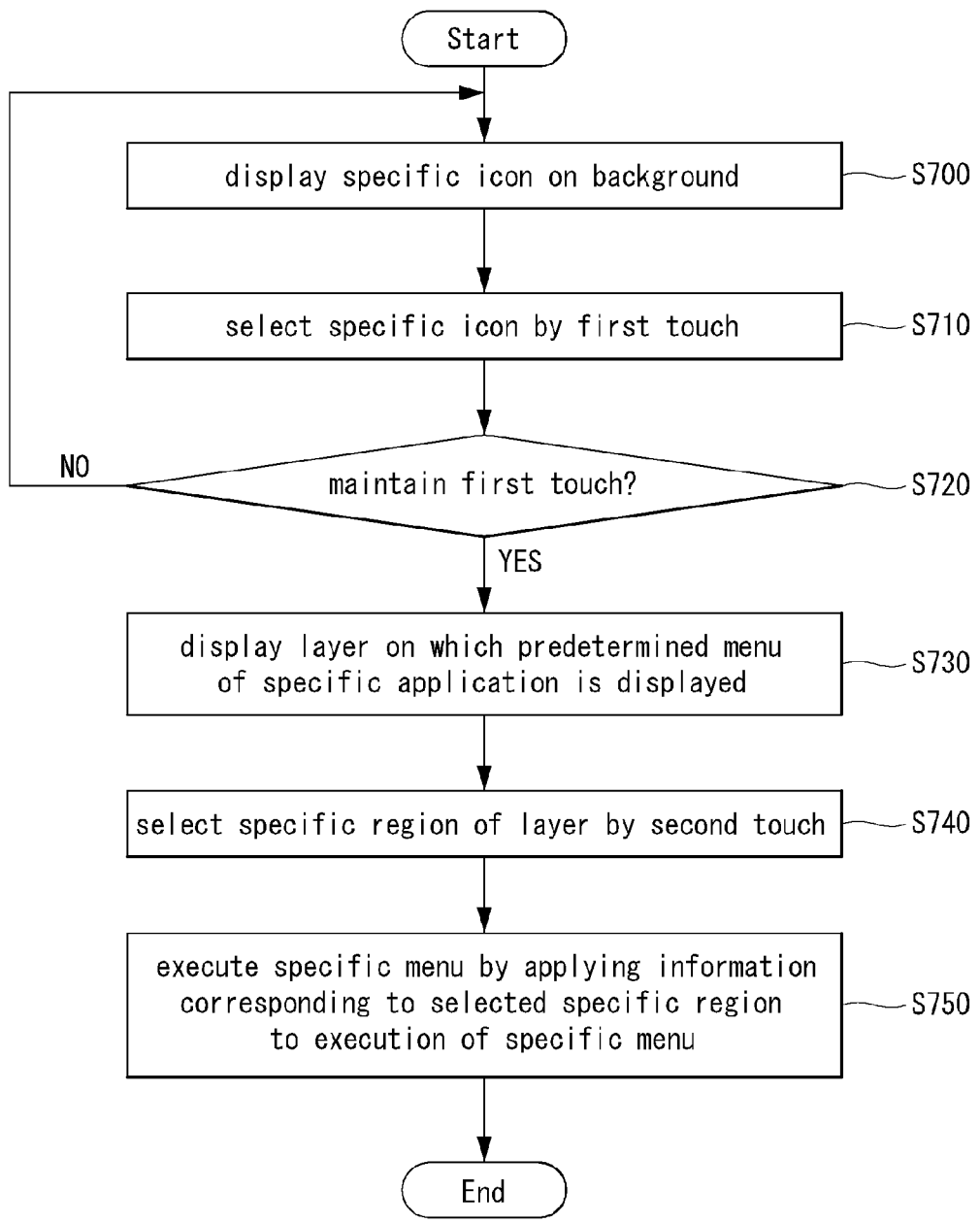
FIG. 37 is a flowchart illustrating a method of executing an application in the mobile terminal according to another embodiment of the present invention.

FIG. 37 is a flowchart illustrating a method of executing an application in the mobile terminal 100 according to another embodiment of the present invention.

A specific icon is displayed on the background of the display module 151 of the mobile terminal 100 (S700). Here, at least one icon other than the specific icon may be displayed on the background.

The user selects the specific icon by a first touch (S710). Then, the controller 180 of the mobile terminal 100 maintains whether the first touch to the specific icon is maintained (S720).

When the first touch to the specific icon is maintained, the controller 180 displays a layer on which a predetermined menu of a specific application corresponding to the specific icon is displayed, on the display module 151 (S730). Here, the layer may be displayed in at least part of the background. The layer may be a transparent, translucent or opaque region. Furthermore, the layer may display a plurality of items that constitute the specific menu.

When the user applies a second touch to the layer displayed on the display module 151, the controller 180 selects a specific region of the layer on the basis of the second touch (S740).

Upon selection of the specific region of the layer, the controller 180 executes the predetermined menu using information corresponding to the selected specific region (S750). Here, the information corresponding to the selected specific region may be information corresponding to the specific region of the layer to which the second touch is applied or information corresponding to an item moved to the specific region by the touch from among the plurality of items.

Examples of the application execution method shown in FIG. 37 will be described with reference to FIGS. 38 to 48.

FIGS. 38A through 39B illustrate an example of a procedure of executing the navigation application according to the application execution method shown in FIG. 37.

Figure 38A:
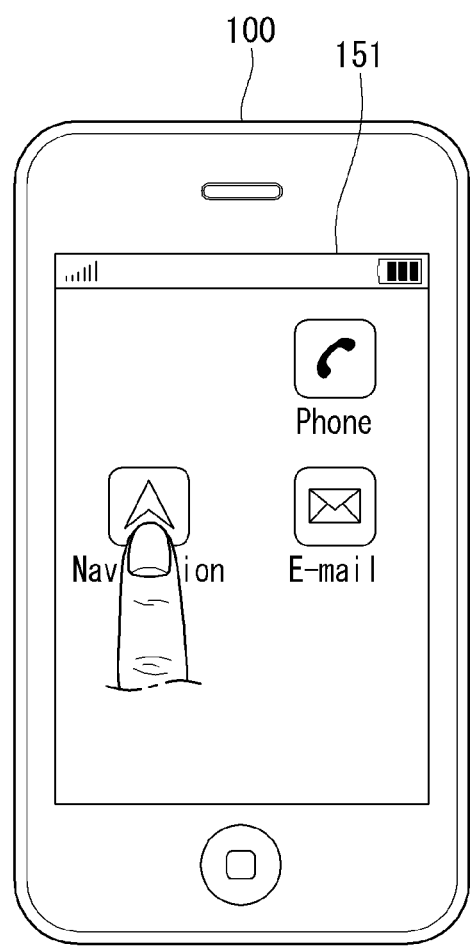
FIGS. 38A through 39B illustrate a procedure of executing a navigation application according to the application execution method of the mobile terminal shown in FIG. 37.
Figure 38B:
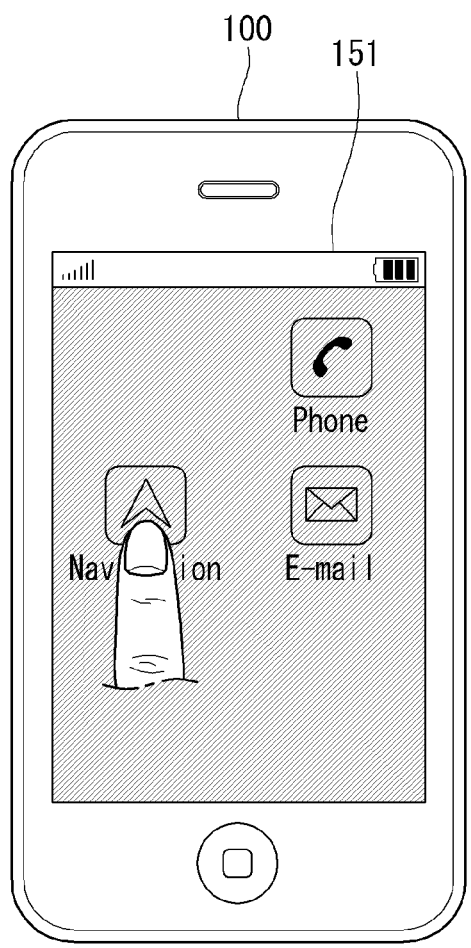

FIG. 38A shows that the user touches the navigation application icon in the state that the navigation application icon and other icons are displayed on the background of the display module 151. The touch of the navigation application icon is maintained until the display state is changed to a state shown in FIG. 39B. Upon selection of the navigation application icon, the controller 180 gradually changes the background into an opaque state, as shown in FIG. 38B.

Figure 38C:
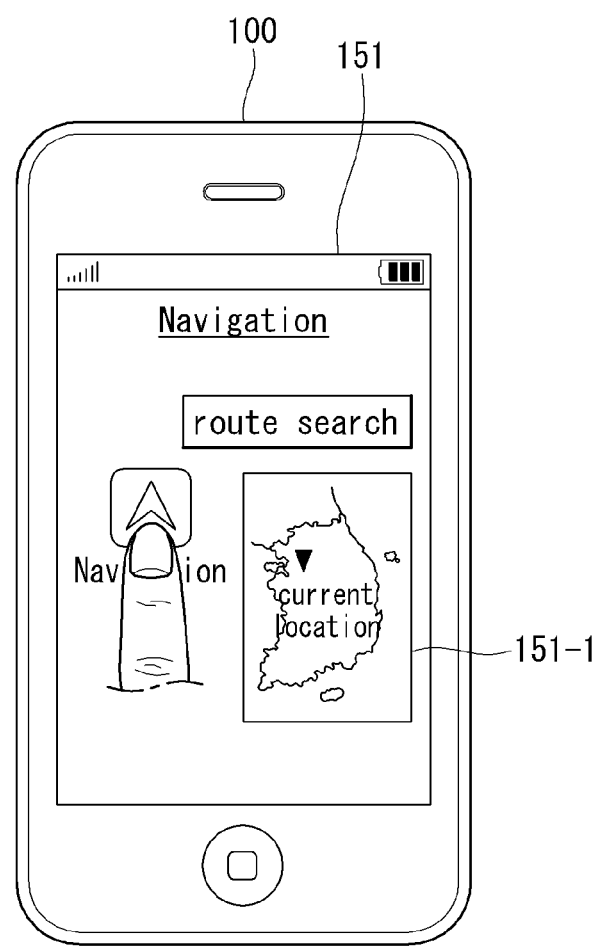

Subsequently, the controller 180 displays an opaque layer on which a route search menu of the navigation application is displayed, on the display module 151, as shown in FIG. 38C. Referring to FIG. 38C, the controller 180 can indicate the current location of the mobile terminal 100 on a map 151-1 displayed on the layer.

Figure 39A:
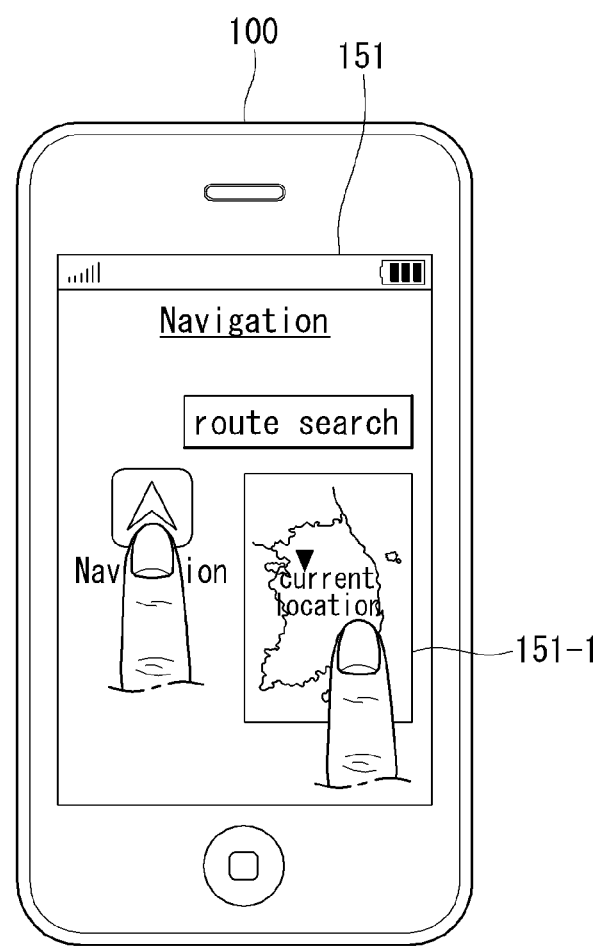
Figure 39B:
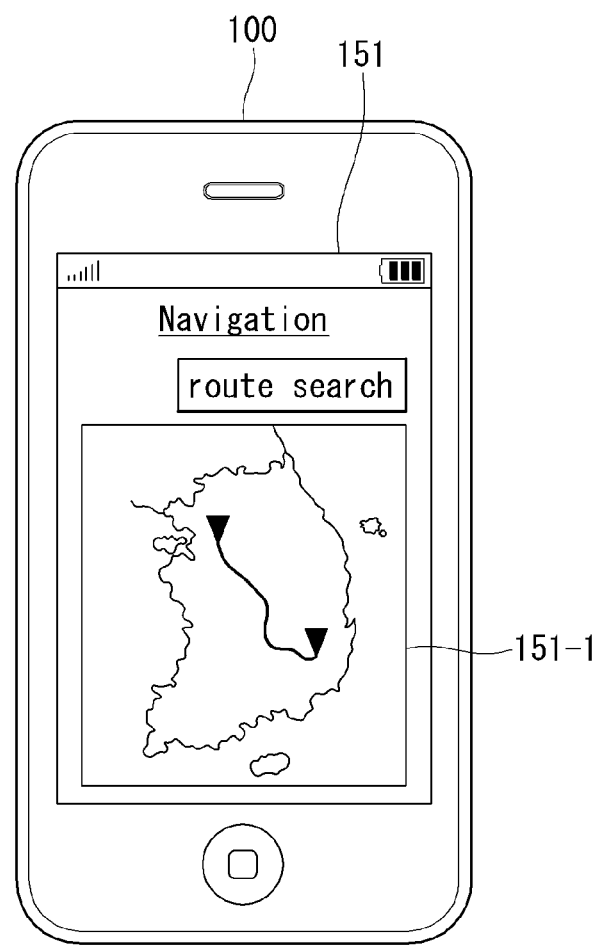

The user touches a specific point on the map 151-1 for selecting a destination of route search, which is displayed on the layer, as shown in FIG. 39A, to select the specific point. And the user cancels the touch of the navigation application icon. Then, the controller 180 searches a route from the current location of the mobile terminal 100 to the specific point selected by the touch on the map 151-1, as shown in FIG. 39B.

Figure 40A:
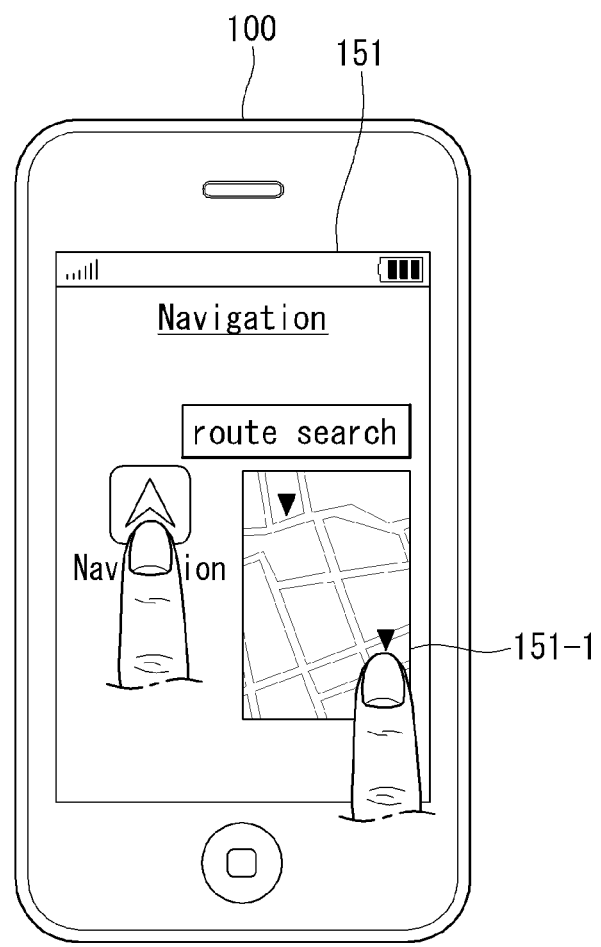
FIGS. 40A and 40B illustrate another example of the procedure of executing the navigation application according to the application execution method of the mobile terminal shown in FIG. 37.
Figure 40B:
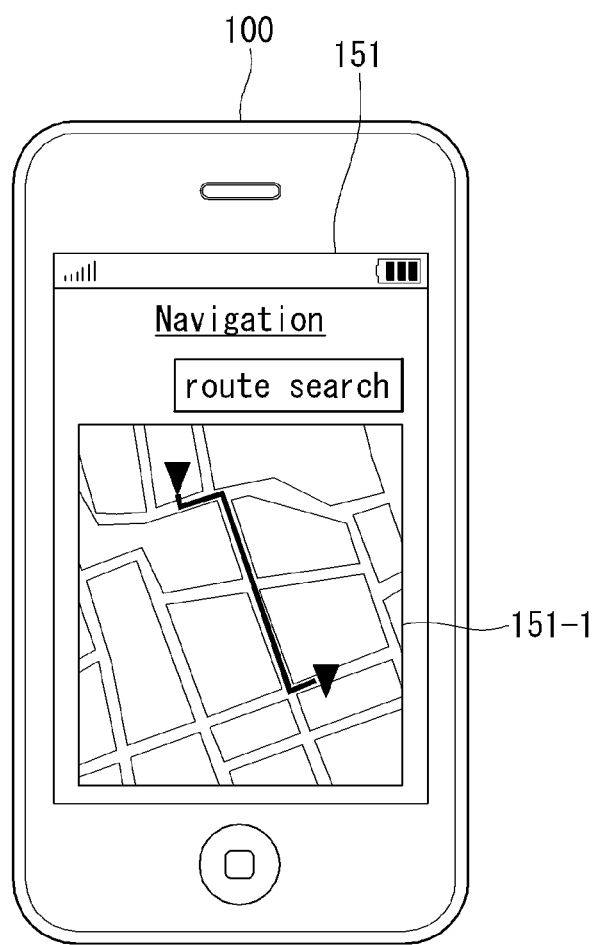

FIGS. 40A and 40B illustrate another example of the procedure of executing the navigation application according to the application execution method shown in FIG. 37.

FIG. 40A shows that the map 151-1 for selecting a destination of route search is displayed on the layer, similarly to FIG. 38C, upon selection of the navigation application icon by the user. The user selects a specific point on the map 151-1 by touching it and cancels the touch of the navigation application icon. Then, the controller 180 searches a route from the current location of the mobile terminal 100 to the specific point selected by the touch and displays the route on the map 151-1, as shown in FIG. 40B.

FIGS. 41A through 42C illustrate an example of a procedure of executing the music play application according to the application execution method shown in FIG. 37.

Figure 41A:
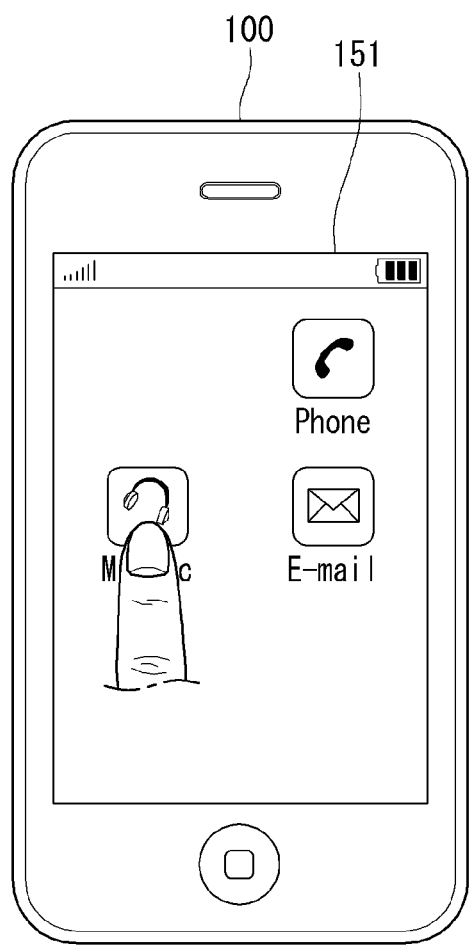
FIGS. 41A through 42C illustrate a procedure of executing a music play application according to the application execution method of the mobile terminal shown in FIG. 37.
Figure 41B:
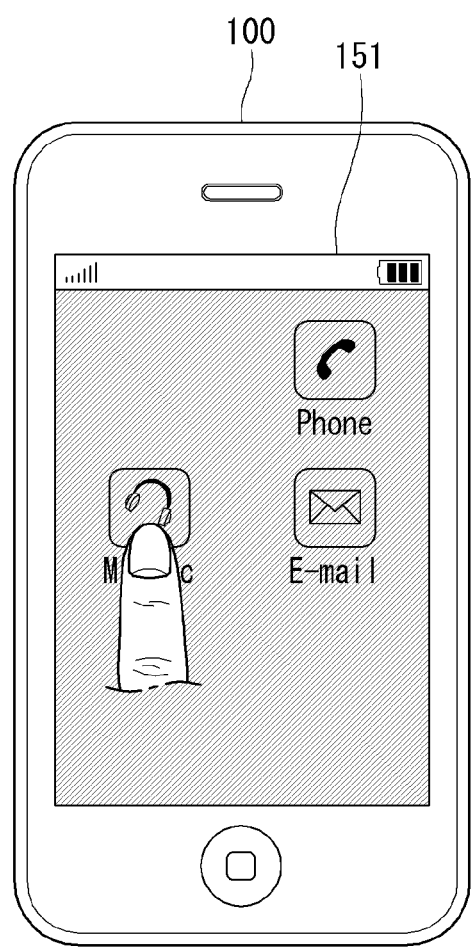

FIG. 41A shows that the user touches the music play application icon in the state that the music play application icon and other icons are displayed on the background of the display module 151. The touch of the music play application icon is maintained until the display state is changed to a state shown in FIG. 42B. Upon selection of the music play application icon, the controller 180 gradually changes the background into an opaque state, as shown in FIG. 41B.

Figure 41C:
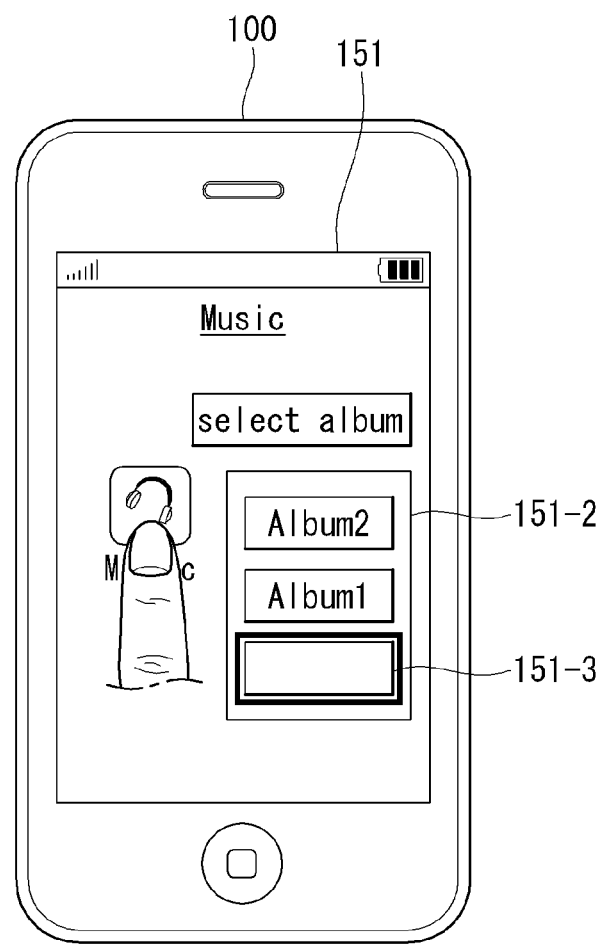

Subsequently, the controller 180 displays an opaque layer on which an album choice menu of the music play application is displayed, on the display module 151, as shown in FIG. 41C. Referring to FIG. 41C, the controller 180 displays a region 151-2 that indicates a plurality of albums stored in the memory 160. The region 151-2 includes a specific region 151-3 that indicates an album selected by touch.

Figure 42A:
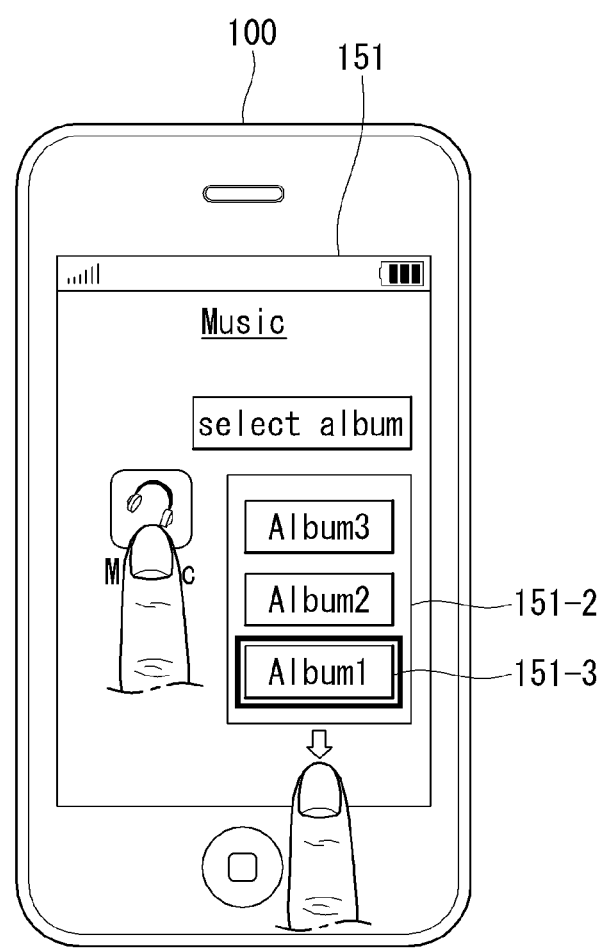

When the user touches the screen downward while the region 151-2 is displayed on the layer, as shown in FIG. 42A, the controller 180 scrolls down an album list displayed in the region 151-2 such that the specific region 151-3 indicates a first album 1 Album1. The user touches the screen downward in the state of FIG. 42A. Then, the controller 180 scrolls down the album list, and thus the specific region 151-3 indicates a second album Album2, as shown in FIG. 42B.

Figure 42B:
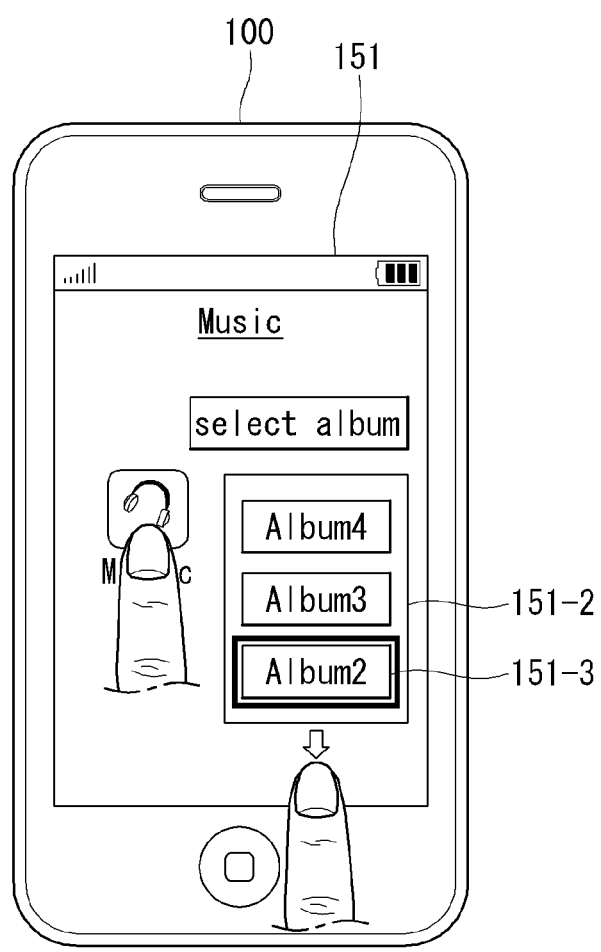
Figure 42C:
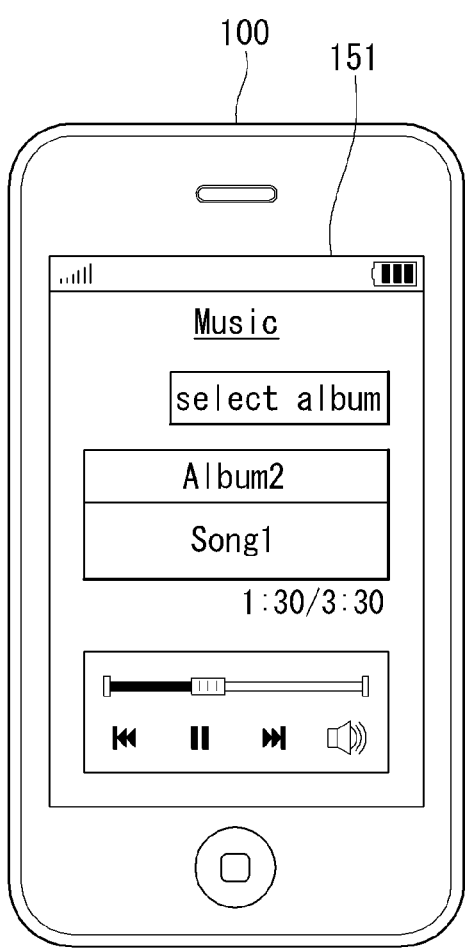

When the user cancels the touch of the music play application icon in the state of FIG. 42B, the controller 180 selects the second album Album2 and reproduces a music file included in the second album, as shown in FIG. 42C.

Figure 43A:
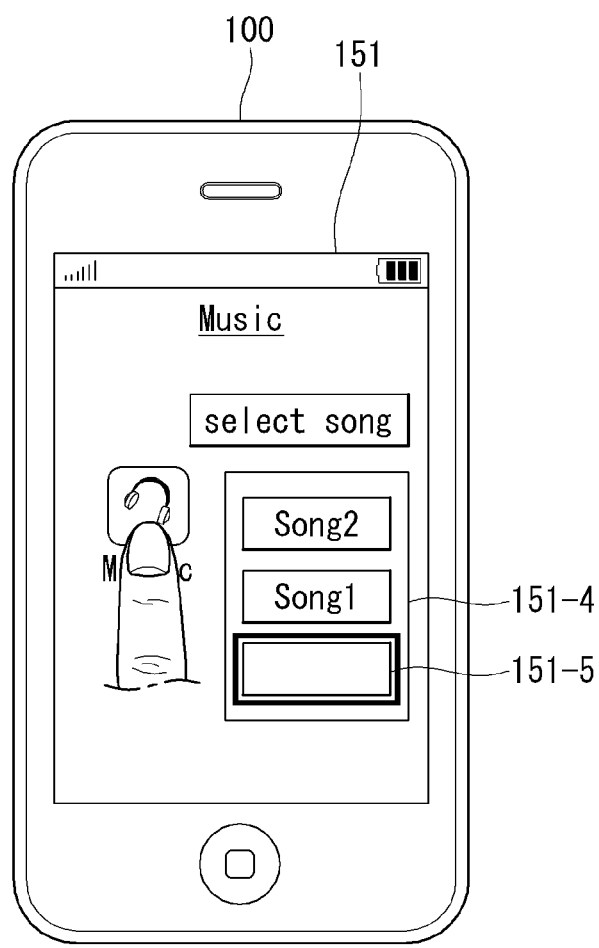
FIGS. 43A through 43C illustrate another example of the procedure of executing the music play application according to the application execution method of the mobile terminal shown in FIG. 37.
Figure 43B:
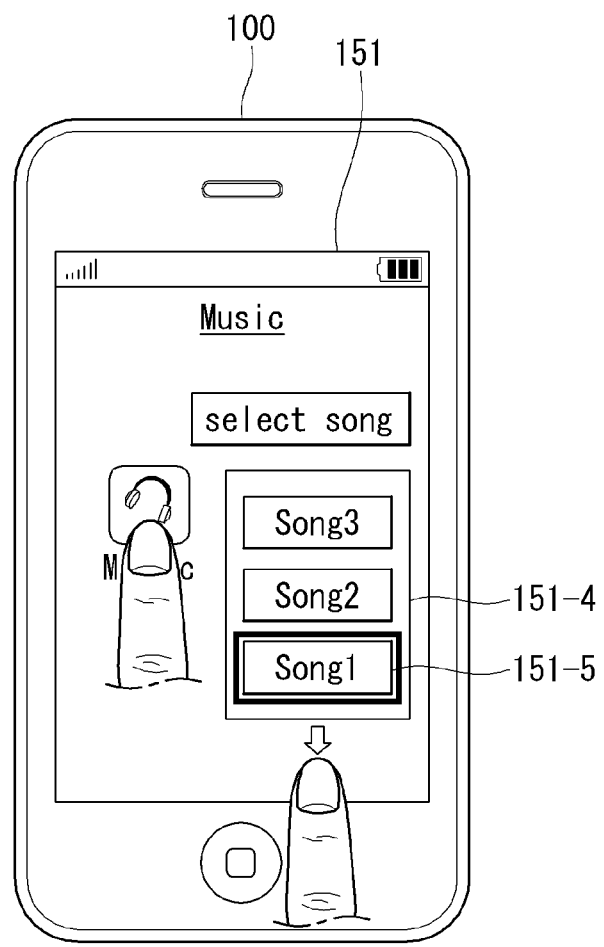
Figure 43C:
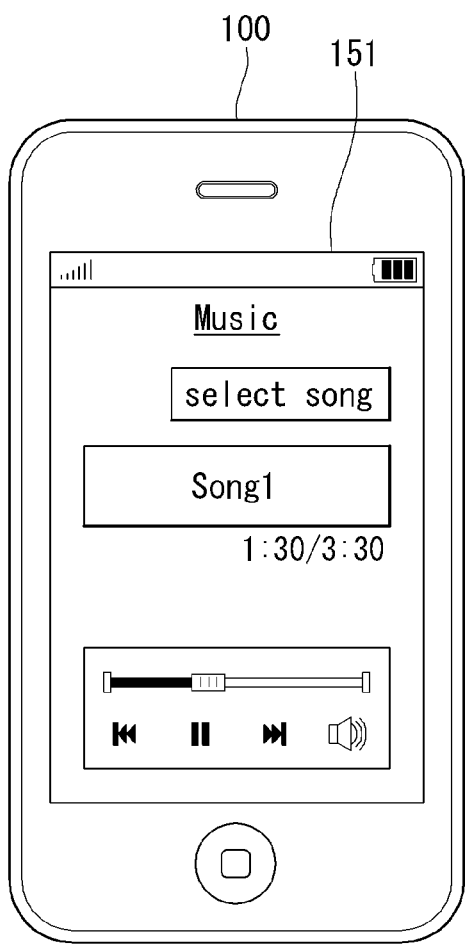

FIGS. 43A through 43C illustrate another example of the procedure of executing the music play application according to the application execution method shown in FIG. 37.

FIG. 43A shows that the user selects the music play application icon and displays a region 151-4 for selecting a song on the layer, similarly to FIG. 41C. Referring to FIG. 43A, the region 151-4 can include a specific region 151-5 that indicates a song selected by touch.

The user touches the screen downward in the state that the region 151-4 is displayed on the layer, as shown in FIG. 43B. Then, the controller 180 scroll downs a song list displayed in the region 151-4, and thus the specific region 151-5 indicates a first song Song1, as shown in FIG. 43B.

The user cancels the touch of the music play application icon in the state of FIG. 43B. Then, the controller 180 selects the first song and plays the first song, as shown in FIG. 43C.

FIGS. 44A through 45B illustrate an example of a procedure of executing the web browsing application according to the application execution method shown in FIG. 37.

Figure 44A:
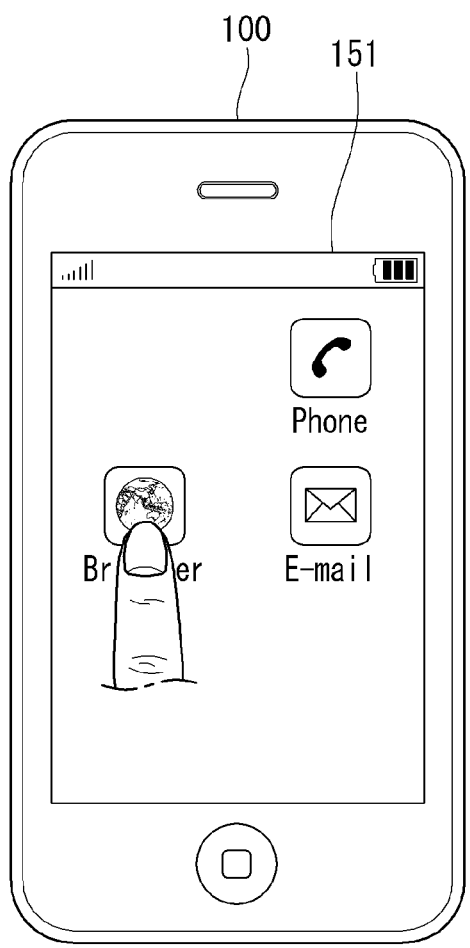
FIG. 44A through and 45B illustrate an example of a procedure of executing a web browsing application according to the application execution method of the mobile terminal shown in FIG. 37.
Figure 44B:
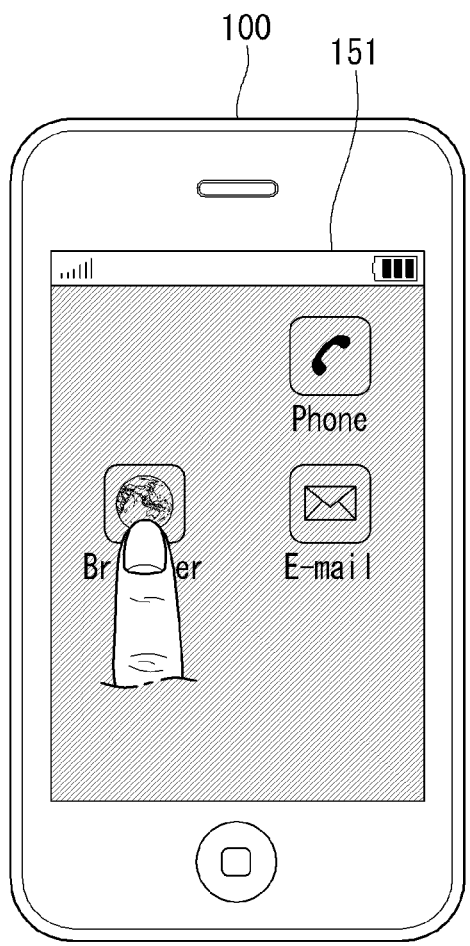

FIG. 44A shows that the user touches the web browsing application icon in the state that the web browsing application icon and other icons are displayed on the background of the display module 151. The touch of the web browsing application icon is maintained until the display state is changed to a state shown in FIG. 45B. Upon selection of the web browsing application icon, the controller 180 gradually changes the background into an opaque state, as shown in FIG. 44B.

Figure 44C:
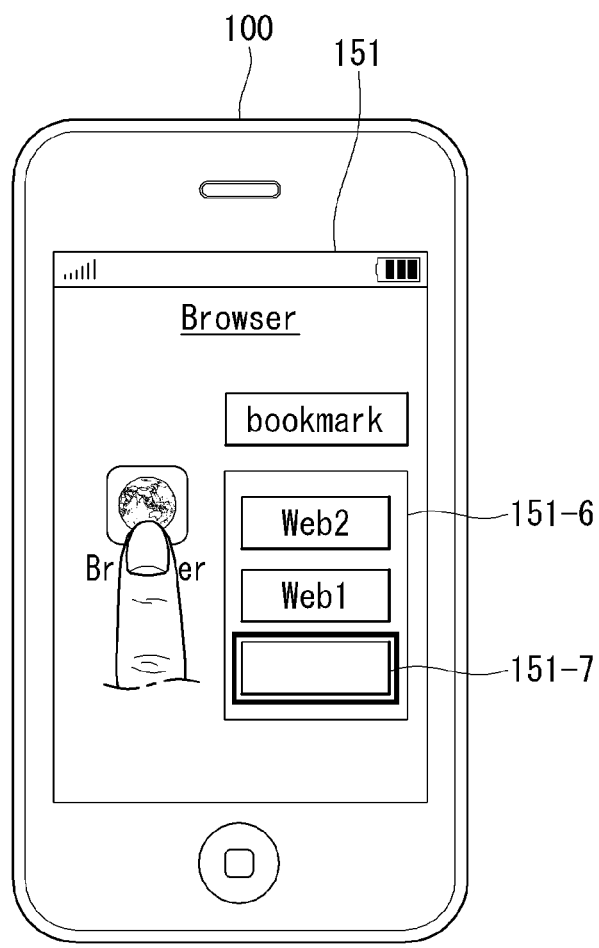

Subsequently, the controller 180 displays an opaque layer on which a bookmark menu of the web browsing application is displayed, on the display module 151, as shown in FIG. 44C. Referring to FIG. 44C, the controller 180 displays a region 151-6 that indicates webpages registered to a bookmark function, which are stored in the memory 160 of the mobile terminal 100, on the display module 151. The region 151-6 can include a specific region 151-7 that indicates a webpage selected by touch.

Figure 45A:
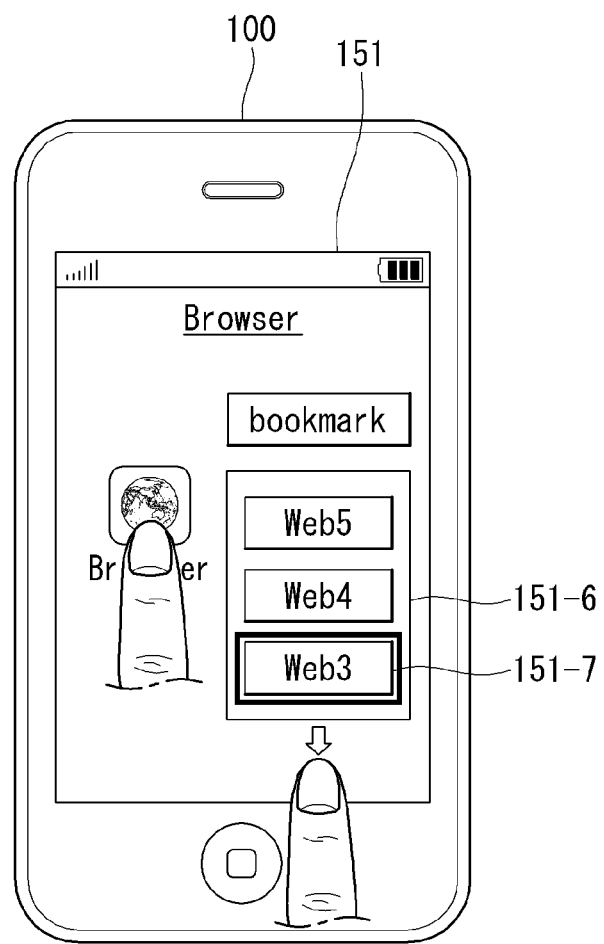
Figure 45B:
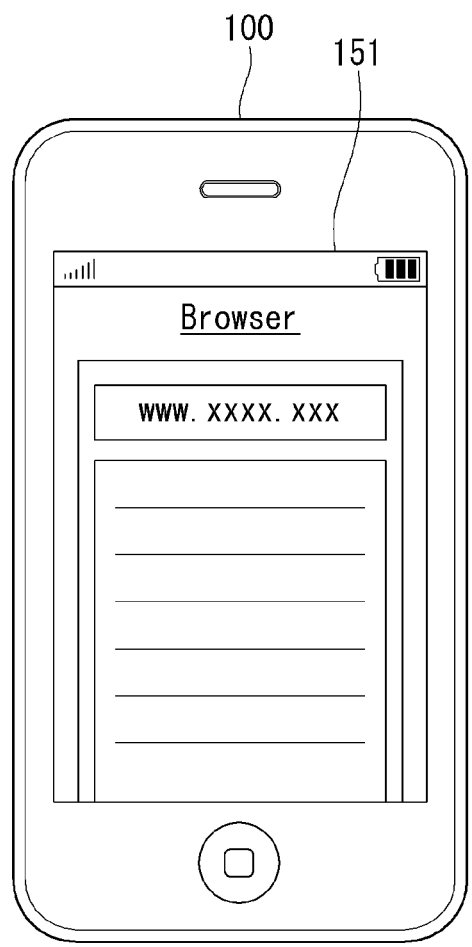

When the user touches the screen downward in the state that the region 151-6 is displayed on the layer, the controller 180 scrolls down a web page list displayed in the region 151-6, as shown in FIG. 45A. As a result, the specific region 151-7 indicates a third web page Web3. In the state of FIG. 45A, the user cancels the touch of the web browsing application icon. Then, the controller 180 executes the web browsing application to access the third web, as shown in FIG. 45B.

FIGS. 46A through 47B illustrate an example of a procedure of executing a camera application according to the application execution method shown in FIG. 37.

Figure 46A:
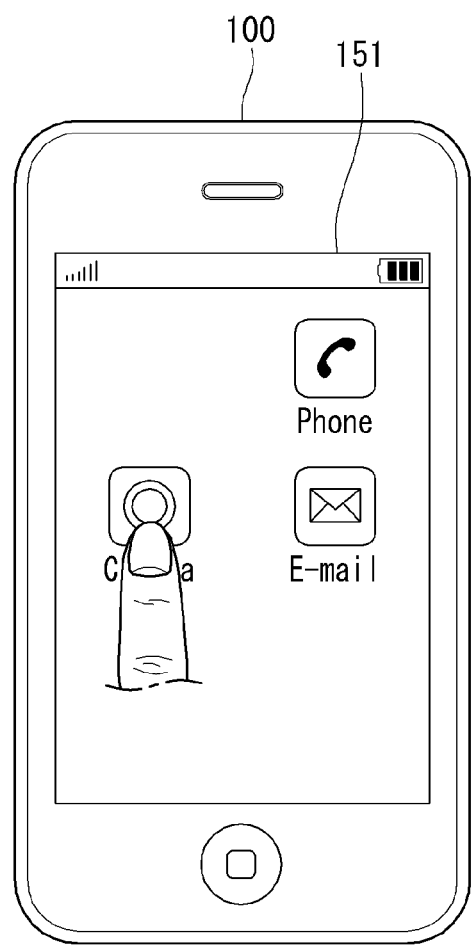
FIGS. 46A through 47B illustrate an example of a procedure of executing a camera application according to the application execution method of the mobile terminal shown in FIG. 37.
Figure 46B:
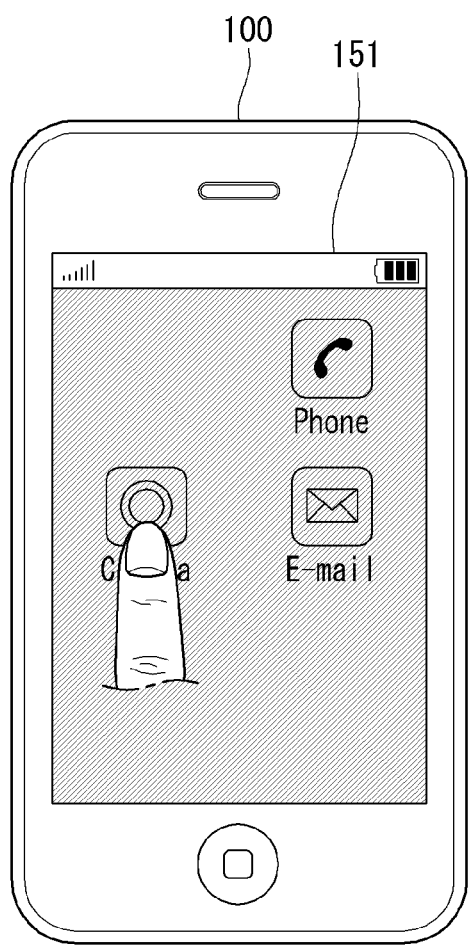

FIG. 46A shows that the user touches a camera application icon while the camera application icon and other icons are displayed on the background of the display module 151. The touch of the web browsing application icon is maintained until the display state is changed to a state shown in FIG. 47A. Upon selection of the camera application icon, the controller 180 gradually changes the background into an opaque state, as shown in FIG. 46B.

Figure 46C:
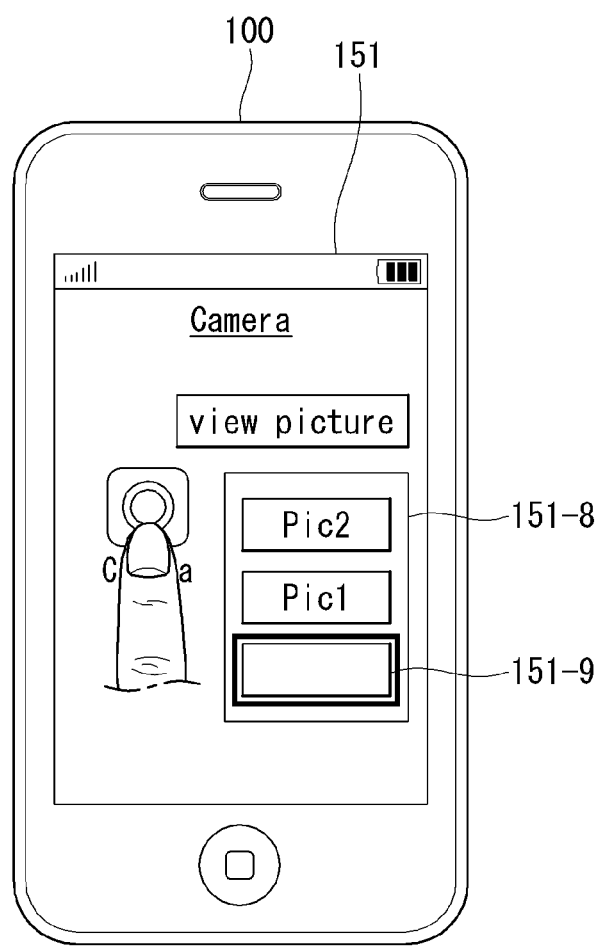

Subsequently, the controller 180 displays an opaque layer on which a photo view menu of the camera application is displayed, on the display module 151, as shown in FIG. 46C. Referring to FIG. 46C, the controller 180 displays a region 151-8 that indicates pictures stored in the memory 160 of the mobile terminal 100, on the display module 151. The region 151-8 can include a specific region 151-9 that indicates a picture selected by touch.

Figure 47A:
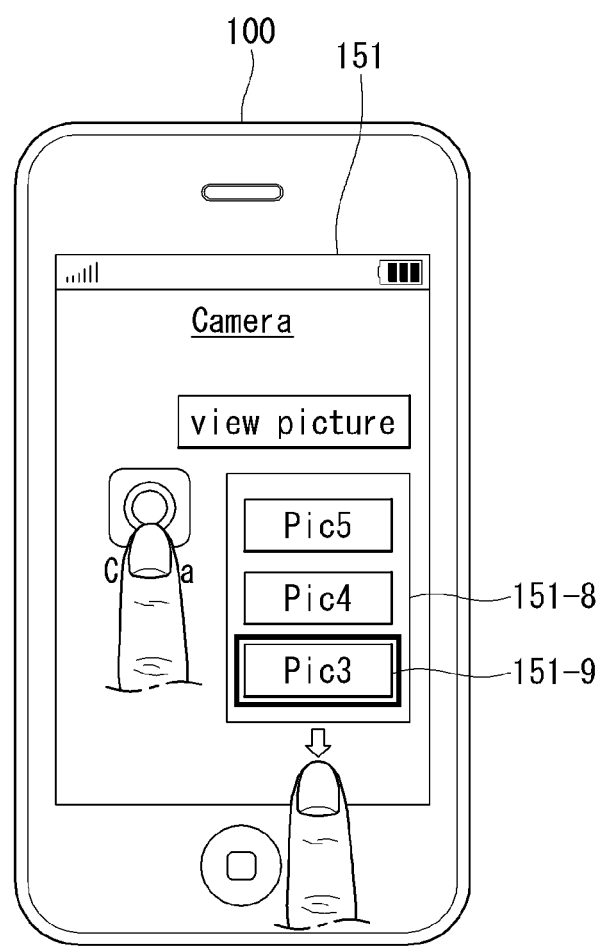
Figure 47B:
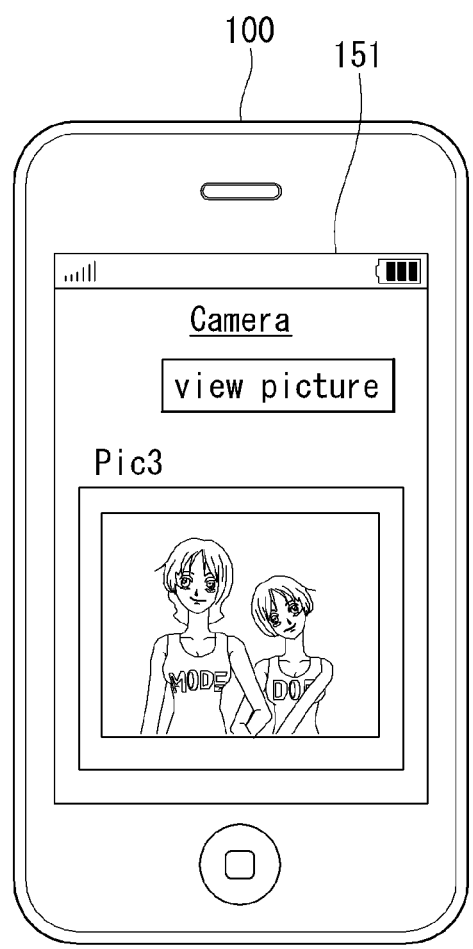

When the user touches the screen downward while the region 151-8 is displayed on the layer, the controller 180 scrolls down a picture list displayed in the region 151-8, as shown in FIG. 47A. As a result, the specific region 151-9 indicates a third photo Pic3. In the state of FIG. 47A, the user cancels the touch of the camera application icon. Then, the controller 180 executes the camera application to display the third picture Pic3 on the display module 151, as shown in FIG. 47B.

Figure 48A:
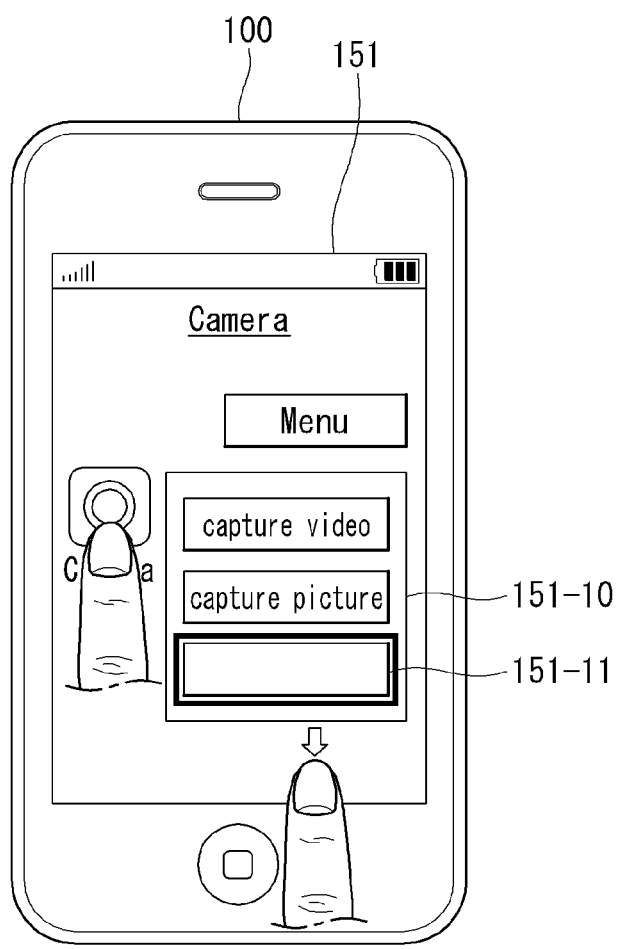
FIG. 48A through 48C illustrate another example of the procedure of executing the camera application according to the application execution method of the mobile terminal shown in FIG. 37.
Figure 48B:
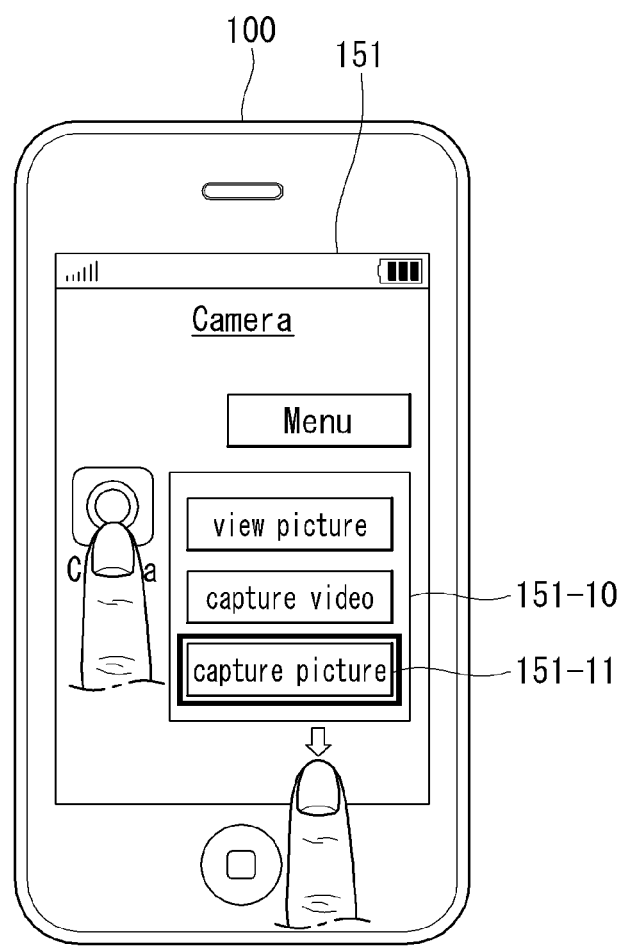
Figure 48C:
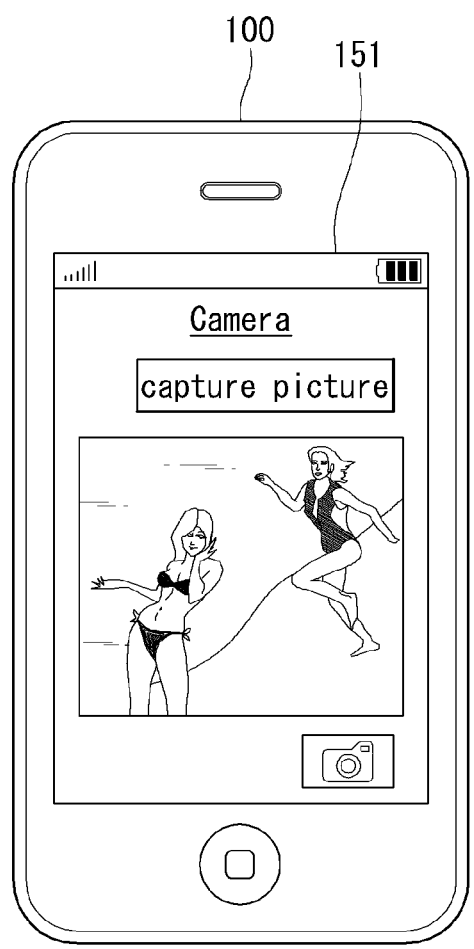

FIGS. 48A through 48C illustrate another example of the procedure of executing the camera application according to the application execution method shown in FIG. 37.

FIG. 48A shows that a region 151-10 that indicates functions executable in the camera application is displayed upon selection of the camera application icon by the user, similarly to FIG. 46C. Referring to FIG. 48A, the region 151-10 can include a specific region 151-11 that includes a function selected by touch.

When the user touches the screen downward while the region 151-10 is displayed on the layer, the controller 180 scrolls down a function list displayed in the region 151-10, and thus the specific region 151-11 indicates a picture photographing function, as shown in FIG. 48B.

The user cancels the touch of the camera application icon in the state of FIG. 48B. Then, the controller 180 executes the camera application to perform the picture photographing function, as shown in FIG. 48C.

The methods of executing applications in the mobile terminal 100 according to the present invention may be implemented as program commands that can be executed by various computer means and written to a computer-readable recording medium. The computer-readable recording medium may include a program command, a data file, a data structure, etc. alone or in combination. The program commands written to the medium are designed or configured especially for the present invention, or known to those skilled in computer software.

Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a touch screen; and
   a controller configured to:
      cause the touch screen to display a plurality of applications on a first background screen;
      cause the touch screen to display a second background screen in response to a first touch input received at the first background screen, the first touch input comprising selecting a first application from the plurality of applications;
      execute a first function of the selected first application or a second function of a second application in response to a second touch input received at the second background screen, the second touch input comprising moving the selected first application to a specific location of the second background screen, the first function executed according to information relating to the specific location, the second function executed according to information of the selected first application; and
      cause the touch screen to display information corresponding to the executed first function on the second background screen,
   wherein the second background screen comprises an execution screen of the second application or a screen including information associated with the selected first application, and
   wherein the first application is selected when the first application is touched by the first touch input and the selected first application is not moved until the second touch input is received.

2. The mobile terminal of claim 1, wherein the controller is further configured to:
   maintain the second background screen on the touch screen only when the first application is selected; and
   restore the first background screen in response to cancellation of the selection of the first application.

3. The mobile terminal of claim 1, wherein the controller is further configured to restore the first background screen after executing the first or second function.

4. The mobile terminal of claim 1, wherein the controller is further configured to maintain the second background screen until a control signal for changing the second background screen to a different background screen is input.

5. The mobile terminal of claim 4, wherein the controller is further configured to:
   maintain the second background screen in a deactivated state until a predetermined application corresponding to the second background screen is selected; and activate a function of the second background screen, which corresponds to the predetermined application, when the predetermined application is selected.

6. The mobile terminal of claim 5, wherein the controller is further configured to cause the touch screen to display the selected first application and at least one of at least one predetermined application corresponding to the second background screen, on the second background screen.

7. The mobile terminal of claim 6, wherein the controller is further configured to set a screen on which the selected first application and the at least one of the at least one predetermined application corresponding to the second background screen are displayed as a home screen page.

8. The mobile terminal of claim 1, wherein the specific location of the second background screen corresponds to one of a plurality of items displayed on the second background screen.

9. The mobile terminal of claim 1, wherein at least a portion of the first background screen is not displayed on the touch screen when the second background screen is displayed on the touch screen.

10. The mobile terminal of claim 9, wherein at least one of the plurality of applications is no longer displayed on the touch screen while the selected first application and the second background screen are displayed on the touch screen.

* * * * *